(12) United States Patent
Miyazaki et al.

(10) Patent No.: US 6,873,706 B1
(45) Date of Patent: Mar. 29, 2005

(54) PROCESSING APPARATUS, PROGRAM, OR SYSTEM OF SECRET INFORMATION

(75) Inventors: Kunihiko Miyazaki, Kawasaki (JP);
Kazuo Takaragi, Kawasaki (JP);
Yasuko Fukuzawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/622,371

(22) PCT Filed: Sep. 29, 1999

(86) PCT No.: PCT/JP99/05353
§ 371 (c)(1),
(2), (4) Date: Feb. 16, 2001

(87) PCT Pub. No.: WO01/24439
PCT Pub. Date: Apr. 5, 2001

(51) Int. Cl.[7] .......................... H04L 9/10; G06F 12/14; G06K 17/00

(52) U.S. Cl. ................. 380/30; 380/1; 380/28; 380/277; 380/286; 713/180; 713/181; 713/189; 713/193; 713/194; 713/200; 713/201

(58) Field of Search .................. 380/277, 286, 380/1, 28, 30; 713/200–201, 193–194, 180–181, 189

(56) References Cited

U.S. PATENT DOCUMENTS

| | | | | |
|---|---|---|---|---|
| 5,768,389 A | * | 6/1998 | Ishii | 380/30 |
| 5,825,880 A | * | 10/1998 | Sudia et al. | 713/180 |
| 5,937,066 A | * | 8/1999 | Gennaro et al. | 380/286 |
| 6,411,715 B1 | * | 6/2002 | Liskov et al. | 380/277 |
| 2002/0080970 A1 | * | 6/2002 | Scheidt et al. | 380/277 |

FOREIGN PATENT DOCUMENTS

| | | |
|---|---|---|
| EP | 99973813 | 8/1999 |
| JP | 3-76447 | 4/1991 |
| JP | 10282881 | 10/1998 |
| JP | 11316542 | 11/1999 |
| WO | 98/36520 | 8/1998 |

OTHER PUBLICATIONS

Schneier B; "Applied Cryptography", Applied Cryptography, Protocols, Algorithms, and Source Code in C, New York, John Wiley & Sons, U.S., Page(s) 70–73, XP002141258, ISBN: 0–471–11709–9, p. 70, line 1–p. 72, line 12.

Kaji Y et al: "Declare–Next Authentication Method—Secure Use Of Insecure Magnetic Cards", Denshi Joho Tsushin Gakkai Gijutsu Kunkyu Hokoku—IEICE Technical Report, Denshi Joho Tsushin Gakkai, Tokyo, JP, Dec. 1995, pp. 21–28, XP002945865, ISSN: 0913–5685, 2. Formal description of DN–Method.

(Continued)

*Primary Examiner*—Andrew Caldwell
*Assistant Examiner*—Minh Dieu Nguyen
(74) *Attorney, Agent, or Firm*—Mattingly, Stanger, Malur & Brundridge, P.C.

(57) ABSTRACT

To provide a secure cryptographic device such as an IC card which can endure TA (Timing Attack), DPA (Differential Power Analysis), SPA (Simple Power Analysis), or the like as an attaching method of presuming secret information held therein, when the secret information held in the card or another information which is used in the secret information or an arithmetic operation using such secret information when such an arithmetic operation is performed is shown by a plurality of expressing methods and the arithmetic operation is performed, thereby making an arithmetic operation processing method different each time the arithmetic operation is performed and making each of an arithmetic operation time, an intensity of a generated electromagnetic wave, and a current consumption different.

15 Claims, 12 Drawing Sheets

OTHER PUBLICATIONS

B. Schneider, "Applied Cryptography (Second Edition)," John Wiley & Sons, Inc. (1996), pp. 71–73.

K. Takaragi, et al, "Current Cards Society and Security Technology," The Japanese Society of Printing Science and Technology, vol. 29, No. 3 (113rd volume), pp. 288–295.

Yuichi Kaji, et al, Personal Authentication by Password declare–next authentication–Secure Personal Authentication by Magnetic Card Technical Report of the Institute of Electronics, Information and Communication Engineers (ISEC 95–39 to 44) vol. 95, No. 423, pp. 21–28.

Smart Card Handbook, John Wiley & Sons, 1997, R. Effing.

Banking– Secure Cryptographic Devices (Retail)—Part 1: Concepts, Requirements and evaluation methods, First Edition, Jun. 15, 1998, ISO13491, ISO13491-1.

DPA, Introduction to Differential Power Analysis and Related Attacks, 1998, P. Kocher et al.

Timing Attacks on Implementation of Diffie—Hellman, RSA, DSS, and Other Systems, CRYPTO'96, 1996, P. Kocher.

Working Draft: American National Standard X.9.63–199x Public Key Cryptography for the Financial Services Industry: Key Agreement and Key Transport Using Elliptic Curve Cryptography, American National Standards Institute, Jan. 9, 1999.

Standard Specifications for Public Key Cryptography (Draft Version 9), IEEE P1363 Standard, IEEE, Feb. 8, 1999.

Speeding up the computations on an elliptic curve using addition–subtraction chains, Theoretical Informatics and Applications, vol. 24, No. 6, 1990, F. Morain et al.

Applied Cryptography, John Wiley & Sons, Inc., 1996, B. Schneier, pp. 466–469.

How to Share A Secret, Communications of the ACM, vol. 22, No. 11, 1979, A. Shamir, pp. 612–613.

Working Draft American National Standard, X9.62–1998, Public Key Cryptography for the Financial Services Industry: The Elliptic Curve Digital Signature Algorithm (ECDSA), American National Standards Institute, Sep. 20, 1998.

* cited by examiner

PROCESSING APPARATUS, PROGRAM, OR SYSTEM OF SECRET INFORMATION

TECHNICAL FIELD

The invention relates to a technique for assuring a security of information.

BACKGROUND ART

According to an IC card, since the reading and writing operations of information from/into the card are executed under a control of an arithmetic operation processing unit which the IC card itself has in terms of its structure, the information can be safely managed as compared with a magnetic card or the like. Therefore, attention is paid to the use of the IC card as means for safely managing information to be made secret. In future, for example, it is expected that the use of an IC card having a function to decrypt an encrypted message and key information necessary for such a function, an IC card having a function to generate a digital signature to electronic data and key information necessary for such a function, or the like is further spread.

It is known that to find a private key by calculations from information such as public key or digital signature which can be known by everyone is very difficult in consideration of an amount of calculations and is actually impossible.

On the other hand, as a new menace to a device having a function such as encryption, decryption, signing, and the like such as an IC card or the like (referred to as a secure cryptographic device), a possibility of an attacking method such as TA (Timing Attack), DPA (Differential Power Analysis), SPA (Simple Power Analysis), or the like for presuming important information (for example, private key) existing in such a device by analyzing a processing time, a current consumption, a generated electromagnetic wave, or the like under an ordinary usage from the outside of the device without physically and directly analyzing such information has been pointed out. For example, if a private key to sign is analyzed by those attacks, an influence such that a person with malice can pretend to become a legal owner is larger, and countermeasures against it are demanded.

The IC card has been disclosed in a literature [Handbook], Rankl Effing, "Smart Card Handbook", John Wiley & Sons, 1997.

The secure cryptographic device has been disclosed in a literature [ISO13491], ISO13491-1, "Banking-Secure cryptographic devices (retail)-Part 1: Concepts, requirements and evaluation methods", First edition, Jun. 15, 1998.

The attacks such as TA (Timing Attack), DPA (Differential Power Analysis), SPA (Simple Power Analysis), and the like have been disclosed in a literature [DPA], Paul Kocher, Joshua Jaffe and Benjamin Jun, "Introduction to Differential Power Analysis and Related Attacks", 1998, and a literature [TA], Paul Kocher, "Timing Attacks on Implementations of Diffie-Hellman, RSA, DSS, and Other Systems", CRYPTO'96, 1996, besides the above literature [Handbook].

Each of the attacking methods is based on a principle that a measurement result which is indirectly obtained and internal information have a correlation.

As a countermeasure against the Timing Attack to an IC card having a decrypting function of an RSA encryption, an idea of a countermeasure using a technique called a blind signature has been shown in the literature [TA]. It is a method whereby in order to make it difficult to collect sample data which is message when the Timing Attack is made, an encrypted sentence which is given as an input is not directly decrypted but an encrypted message to which random number information has been added is decrypted and an influence by the random numbers is finally eliminated again, thereby obtaining a decrypted message. However, such a method is inadequate in terms of a point that a process for raising data to the private key's power is still included.

DISCLOSURE OF INVENTION

The invention is made in consideration of the above problems and it is an object of the invention to provide means and technique for disabling secret information in a secure cryptographic device such as an IC card or the like to be presumed.

That is, another object of the invention is to provide means and technique which invalidate an attacking method such as TA (Timing Attack), DPA (Differential Power Analysis), SPA (Simple Power Analysis), or the like to a secure cryptographic device such as an IC card or the like.

Further another object is to provide an IC card, a security module, a semiconductor chip, a system, a computer, and a program which use those means and techniques.

To accomplish the above objects, according to the invention, there is provided a secret information processing method in a secret information processing apparatus constructed by an arithmetic operation processing circuit, a storing circuit, and a signal line connecting them, whereby the processing method is constructed so as to obtain a same processing result as that obtained by processing the secret information and data serving as a processing target by a well-known processing method, wherein secret information forming information different from the secret information and secret information forming information processing means for outputting the same processing result by using the secret information forming information and the data serving as a processing target are used.

Further, the secret information forming information processing means of the invention executes a process without making the secret information appear on the arithmetic operation processing circuit, the storing circuit, or the signal line.

As a specific example, the secret information is a private key for decryption of an encrypted message or signing, the secret information processing means is means for realizing a well-known algorithm of the decryption or signing, and the processing result is a decrypted message or a generated signature. To know the secret information from the outside is made difficult by using the secret information forming information different from the private key and the secret information forming information processing means for outputting a plain sentence or a signature as a processing result by using the secret information forming information.

Further, the invention is constructed so that the secret information forming information which is processed by the same secret information forming information processing means can have a plurality of values.

Specifically speaking, the storing circuit of the invention constructs the secret information forming information as a plurality of secret information portion information having a plurality of combinations and they are held in the storing circuit.

By using those means, the secret information itself does not appear in any of the cases where it has been held in internal memory means, where it is sent between the memory means and the arithmetic operating means via the signal line (internal bus) in the apparatus, and where it is processed by the processing means in the arithmetic operating means. It is, therefore, difficult to obtain the secret information itself. Further, as for the secret information forming information, since a desired result can be obtained by the secret information forming information processing means which is used in combination with it, even if only the relevant information is obtained, the secret information is not obtained. Moreover, even if the attacker who intends to illegally obtain the secret information finds the secret information forming information processing means, when there are a plurality of kinds of data which can be obtained as secret information forming information, the number of times of trial necessary for the attacker increases, so that it becomes further difficult to obtain the secret information.

It is, therefore, difficult to obtain the secret information itself from such a period of time, an intensity of the generated electromagnetic wave, a current consumption, and the like.

To accomplish the above objects, means for reducing the correlation between the measurement result which is obtained indirectly and the internal information is provided.

More specifically, the following means is used in the invention.

(1) In arithmetic operations using the information to be held secretly, a plurality of expressions showing the information are selectively used every arithmetic operation.

(2) The information which should be made secret and has been held in the storing apparatus by a certain expressing method is converted into another expression each time the arithmetic operation using such information is executed or at a predetermined timing or a timing determined at random, and the original expression is rewritten by the converted new expression.

(3) In arithmetic operations using information A to be held secretly and information B different therefrom, a plurality of expressions showing the information B are selectively used every arithmetic operation.

(4) The information which is used in the arithmetic operation using the information A to be held secretly, namely, the information B different from the information A which should be made secret and has been held in the storing apparatus by a certain expressing method is converted into another expression each time the arithmetic operation using the information A to be made secret is executed or at a predetermined timing or a timing determined at random, and the original expression is rewritten by the converted new expression.

That is, the storing circuit of the invention further has converting means for converting the secret information forming information into another secret information forming information, and the other secret information forming information is information for allowing the secret information forming information processing means to output the same processing result as the above processing result.

Further, the arithmetic operation processing circuit of the invention makes the converting means operative at a predetermined timing.

By using the above means, the time which is required when the arithmetic operation using the information A to be made secret, the intensity of the generated electromagnetic wave, current consumption, and the like do not become constant, so that the relations (correlation) among the information A to be made secret, the time which is required for the arithmetic operation using the information A, the intensity of the generated electromagnetic wave, and the current consumption are reduced.

As a specific example, the secret information forming information processing means and the converting means are programs. Those programs are executed by arithmetic operating means such as a digital signal processor (referred to as a DSP), a central processing unit (referred to as a CPU), or the like.

According to the invention, there is provided a secret information processing system for transmitting and receiving a processing result using the secret information by using the processing apparatus of the secret information, wherein an apparatus on the receiver side of the processing result has means for setting the secret information forming information processing means and the secret information forming information into the storing circuit of the processing apparatus. An apparatus on the user side of the processing apparatus has: means for inputting data as a processing target to the processing apparatus; means for receiving the processing result from the processing apparatus: and means for transmitting the received processing result to the apparatus on the receiver side.

BEST MODE FOR CARRYING OUT THE INVENTION

First Embodiment

An embodiment in which the invention is applied to an IC card having a decrypting function of an Elliptic Curve Encryption Scheme (ECES) as a kind of elliptic curve encryption will now be described hereinbelow by using the diagrams. The Elliptic Curve Encryption Scheme has been disclosed in a literature [X9.63].

The elliptic curve encryption has been disclosed in
a literature [X9.63], "Working Draft: AMERICAN NATIONAL STANDARD X.9.63-199x Public Key Cryptography For The Financial Services Industry: Key Agreement and Key Transport Using Elliptic Curve Cryptography", American National Standards Institute, Jan. 9, 1999, and a literature [IEEEP1363], "Standard Specifications For Public Key Cryptography (Draft Version 9)", IEEE P1363 Standard, IEEE, Feb. 8, 1999.

In the embodiment, the information corresponding to the information (secret information) to be stored secretly is a private key which is used to decrypt the elliptic curve encryption. In the embodiment, it is assumed that an elliptic curve on a finite body of a prime number order is used.

Figure 1:
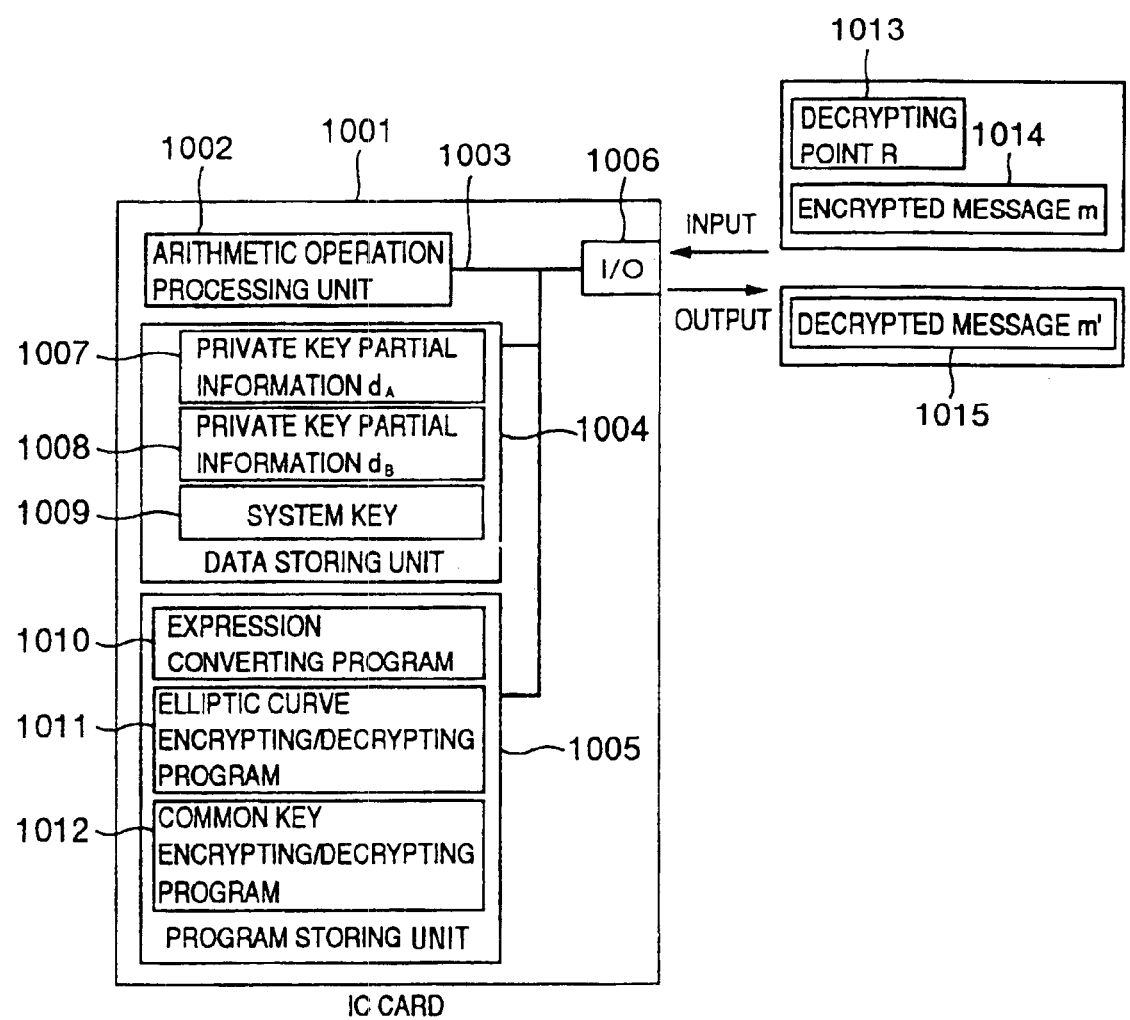
FIG. 1 is a constructional diagram of an IC card in an embodiment of the invention.

FIG. 1 is a constructional diagram of hardware of an IC card in the embodiment. An IC card 1001 comprises: an arithmetic operation processing unit 1002 constructed by a CPU or the like; a data storing unit 1004 and a program storing unit 1005 which are constructed by storing circuits (memories); an I/O 1006 constructed by an interface circuit; and a bus 1003 for internally connecting those component elements.

An expression converting program 1010, an elliptic curve encrypting/decrypting program 1011, and a common key encrypting/decrypting program 1012 have been stored in the program storing unit 1005 and are read out into the arithmetic operation processing unit 1002 and executed, respectively.

A system key 1009 in the elliptic curve encryption has been stored in the data storing unit 1004. The system key is data to decide an elliptic curve which is used in the elliptic curve encryption and has preliminarily been released as a common value for the whole system concerned with the transmission and reception of an encrypted message. The system key includes the following values. That is, it includes: coefficients a and b of a definition expression $y^2 = x^3 + ax + b$ of the elliptic curve; an order p of a finite body in which the elliptic curve is defined; coordinates of a point P called a base point fixed on the elliptic curve; an order n of the base point P; and a number h called a cofactor such that (n×h) is equal to the number of rational points on the elliptic curve.

Data (secret information forming information) showing a private key d which is used for decryption of the elliptic curve encryption has been further stored in the data storing unit 1004. It is a characteristic point that the private key d itself is not stored in the data storing unit. In the embodiment, the secret information forming information is expressed by a combination of private key partial information $d_A$ 1007 and private key partial information $d_B$ 1008 as secret information forming partial information. More specifically, a difference in a modulo (n) of $d_A$ 1007 and $d_B$ 1008 is equal to a value of the private key d. Further, the elliptic curve encrypting/decrypting program 1011 corresponding to the secret information forming information processing means is constructed so that they can be correctly processed. There are a plurality of combinations of $d_A$ 1007 and $d_B$ 1008. For example, assuming that a value of $d_A$ 1007 is set to the private key d itself and a value of $d_B$ 1008 is set to 0 (zero), the combination of $d_A$ 1007 and $d_B$ 1008 becomes an example of the expression of the private key d. If the value of $d_A$ 1007 is set to 0 (zero) and the value of $d_B$ 1008 is set to n−d (mod n), the combination of $d_A$ 1007 and $d_B$ 1008 also becomes an example of the expression different from that of the private key d mentioned above.

An outline of the operation of each program will now be described hereinbelow.

A decrypting process of the elliptic curve encryption by the elliptic curve encrypting/decrypting program 1011 will be first described. The elliptic curve encrypting/decrypting program 1011 is a program including an arithmetic operation on the elliptic curve which is determined by the system key 1009 stored in the data storing unit 1004 and a program for calculating a point dR on the elliptic curve from a point R 1013 for decryption given as an input from the outside of the IC card 1001 and information indicative of the private key stored in the data storing unit 1004, namely, in the embodiment, from the private key partial information $d_A$ 1007 and private key partial information $d_B$ 1008 as an expression of the private key information without obtaining the private key d and calculating a common key for decryption which is necessary to decrypt a encrypted message m 1014 by the common key encrypting/decrypting program 1012. The common key for decryption obtained as an output of this program becomes a part of the input of the common key encrypting/decrypting program 1012.

Subsequently, a decrypting process of the encrypted message by the common key encrypting/decrypting program 1012 will be described. The common key encrypting/decrypting program 1012 is a program for inputting the common key for decryption obtained as an output of the elliptic curve encrypting/decrypting program 1011 and the encrypted message m 1014 given as an input from the outside of the IC card 1001, decrypting the encrypted message m 1014, and outputting a result of the decryption as a decrypted message m' 1015 to the outside of the IC card 1001.

In the embodiment, although the common key encrypting/decrypting process by the common key encrypting/decrypting program 1012 is performed in the IC card 1001, this process can be also executed by an external apparatus which can transmit and receive information to/from the IC card 1001, for example, by a PC or the like which can transmit and receive information to/from the IC card 1001 via an IC card reader/writer. In this case, the input to the IC card 1001 is the decrypting point R 1013 and the output from the IC card 1001 is the common key for decryption as an output of the elliptic curve encrypting/decrypting program.

A flow of the basic operation by the above three programs in case of decrypting the encrypted message m 1014 at the time when the IC card 1001 is used will be summarized as follows.

First, the elliptic curve encrypting/decrypting program 1011 calculates the common key for decryption without obtaining the private key information d from the decrypting point R 1013 as an input from the outside of the IC card 1001 and the private key partial information $d_A$ 1007 and private key partial information $d_B$ 1008 stored in the data storing unit 1004. Subsequently, the common key encrypting/decrypting program 1012 decrypts the encrypted message m 1014 as an input from the outside of the IC card 1001 by using the common key for decryption calculated by the elliptic curve encrypting/decrypting program 1011 and outputs it as a decrypted message m' 1015.

Thus, the encrypted message m can be decrypted.

Since the encrypted message m can be decrypted without allowing the private key d to appear in the data storing unit 1004, bus 1003, and arithmetic operation processing unit 1002 as mentioned above, it is difficult to presume the value of the private key by the TA (Timing Attack), DPA (Differential Power Analysis), SPA (Simple Power Analysis), or the like.

In the embodiment, the values of the private key partial information $d_A$ 1007 and private key partial information $d_B$ 1008 stored in the data storing unit 1004 are fixed. Therefore, each time the decryption is executed, the private key partial information $d_A$ 1007 and private key partial information $d_B$ 1008 as fixed values are supplied to the arithmetic operation processing unit 1002 from the data storing unit 1004 via the bus 1003. Since the elliptic curve encrypting/decrypting program 1011 executes the same calculation every time, the calculating times for this period of time, the intensities of the generated electromagnetic wave, the current consumptions, and the like are also set to the same values, respectively. It means that there is a possibility that the value of the private key partial information is presumed by the TA (Timing Attack), DPA (Differential Power Analysis), SPA (Simple Power Analysis), or the like.

In the invention, the expression converting program 1010 is used as a further another countermeasure against those attacks.

A converting process of the expression of the private key information by the expression converting program 1010 will now be described. The expression converting program 1010 is a program for converting one expression of the private key information read out from the data storing unit 1004 into another expression and substituting (rewriting) this new expression for the original expression in the data storing unit 1004. In the embodiment, the expression converting program 1010 is a program for newly forming a combination of private key partial information $d_A'$ and private key partial information $d_B'$ of another expression from the combination of private key partial information $d_A$ 1007 and private key partial information $d_B$ 1008 as one expression of the private key information read out from the data storing unit 1004 and rewriting the original expression $d_A$ 1007 and $d_B$ 1008 in the data storing unit 1004 by the new expression $d_A'$ and $d_B'$.

Since the values of the private key partial information $d_A$ 1007 and private key partial information $d_B$ 1008 are rewritten to the other values by executing the expression converting program 1010, the data which is supplied from the data storing unit 1004 to the arithmetic operation processing unit 1002 via the bus 1003, the time which is required when the elliptic curve encrypting/decrypting program 1011 is executed in the arithmetic operation processing unit 1002, the intensity of the generated electromagnetic wave, the current consumption, and the like are changed to the different values. Thus, a presumption of the value of the private key by the TA (Timing Attack), DPA (Differential Power Analysis), SPA (Simple Power Analysis), or the like can be made further difficult.

The expression converting program 1010 can be executed every time just before the elliptic curve encrypting/decrypting program 1011 is executed, can be also executed every time just after the elliptic curve encrypting/decrypting program 1011 was executed, can be executed whether the elliptic curve encrypting/decrypting program 1011 is executed several times, or can be also executed at a random timing irrespective of the execution of the elliptic curve encrypting/decrypting program 1011. As countermeasures against the TA (Timing Attack) or DPA (Differential Power Analysis) for the elliptic curve encrypting/decrypting program 1011, it is desirable that the frequency of execution of the expression converting program 1010 is large.

The details of the operation of each program will now be described.

Figure 2:
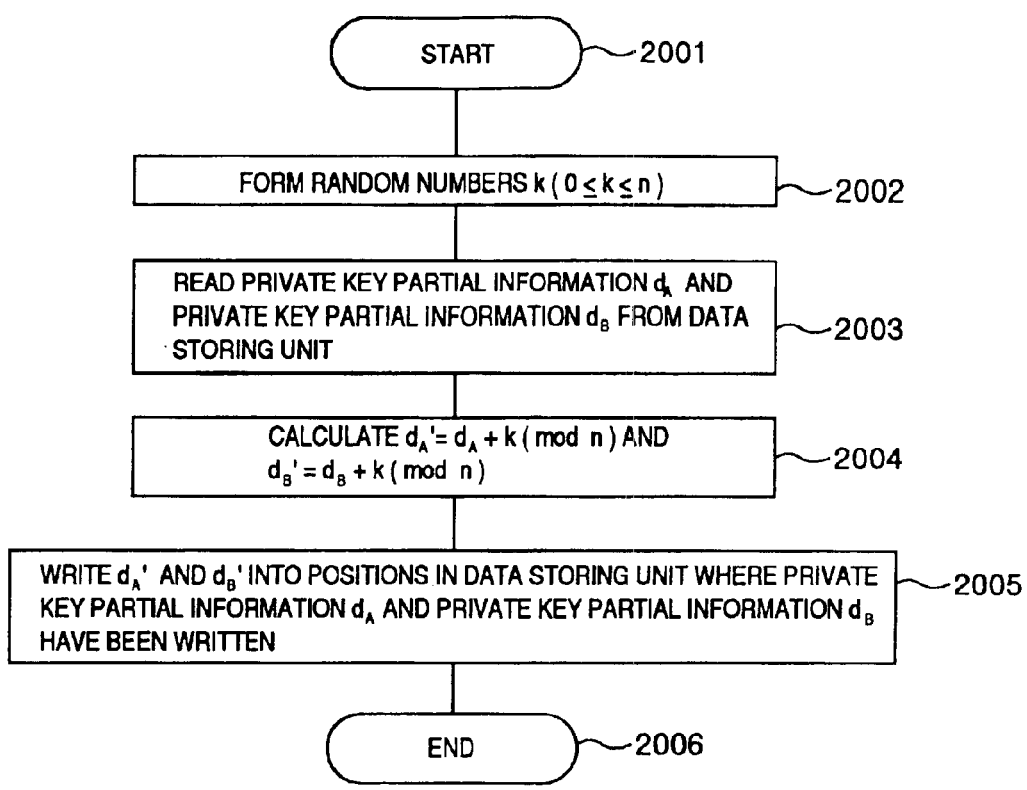
FIG. 2 is a flowchart for an expression converting program in the IC card construction of FIG. 1.

FIG. 2 shows a flow for the expression converting program 1010 in FIG. 1.

Step 2001: Start

Step 2002: Form random numbers k ($0 \leq k < n$).

Step 2003: Read the private key partial information $d_A$ 1007 and private key partial information $d_B$ 1008 from the data storing unit 1004.

Step 2004: Calculate $d_A' = d_A + k \pmod{n}$ and $$d_B' = d_B + k \pmod{n}$$

Step 2005: Write $d_A'$ and $d_B'$ into the positions in the data storing unit 1004 where the private key partial information $d_A$ 1007 and private key partial information $d_B$ 1008 have been written, respectively.

Step 2006: End

Figure 3:
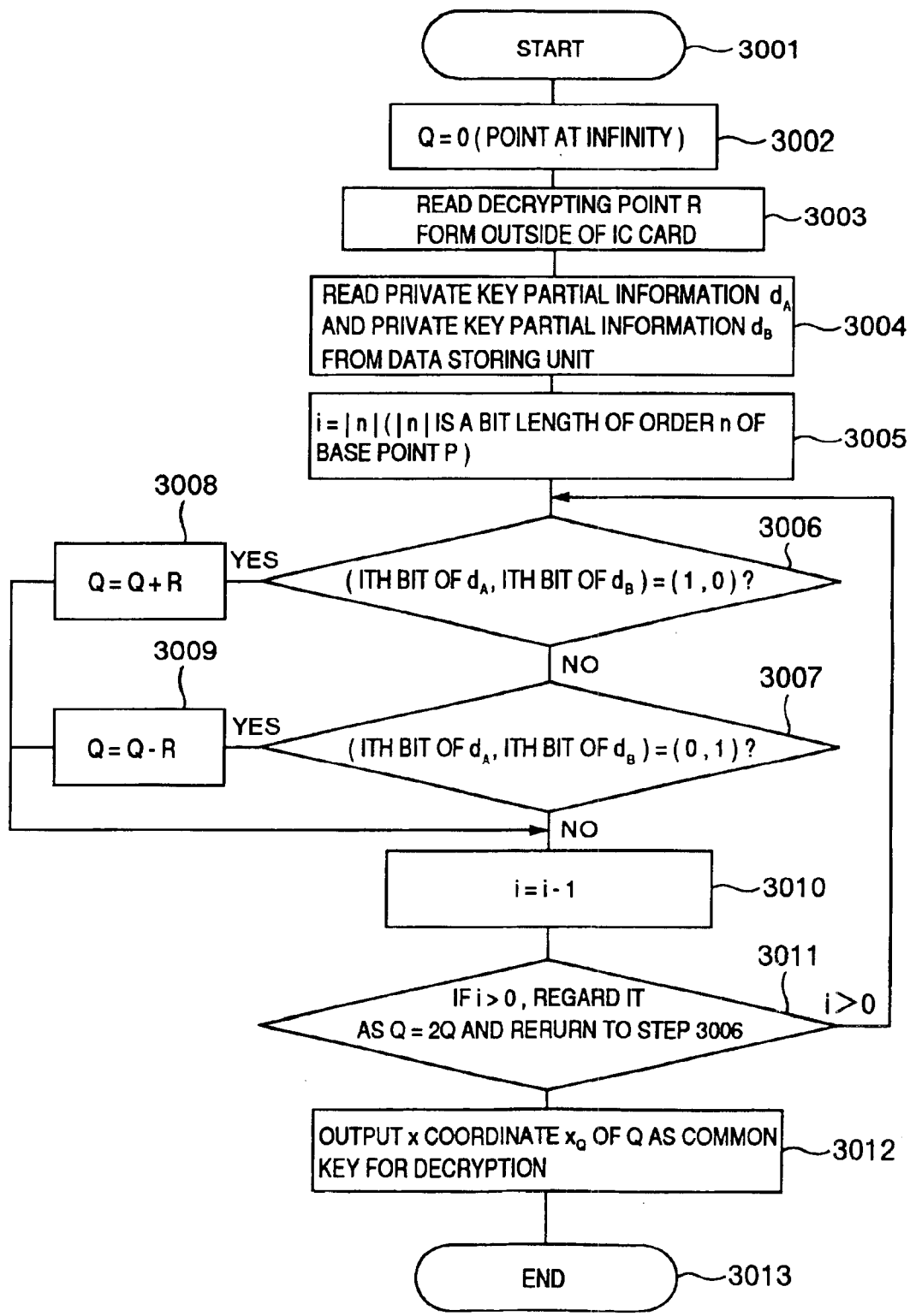
FIG. 3 is a flowchart for an elliptic curve encrypting/ decrypting program in the IC card construction of FIG. 1.

FIG. 3 shows a flow for the elliptic curve encrypting/decrypting program 1011 in FIG. 1.

Step 3001: Start

Step 3002: Set Q=0 (point at infinity)

Step 3003: Read decrypting point R 1013 from the outside of the IC card 1001.

Step 3004: Read the private key partial information $d_A$ 1007 and private key partial information $d_B$ 1008 from the data storing unit 1004.

Step 3005: Set i=|n| (|n| denotes a bit length of the order n of the base point P).

Step 3006: If (the ith bit of $d_A$ 1007, the ith bit of $d_B$ 1008)=(1, 0), step 3008 follows (it is assumed that the ith bit is counted so as to increase as it approaches the upper bit while setting the least significant bit to the first bit).

Step 3007: If (the ith bit of $d_A$ 1007, the ith bit of $d_B$ 1008)=(0, 1), step 3010 follows. If NO, step 3009 follows (the ith bit is counted so as to increase as it approaches the upper bit while setting the least significant bit to the first bit).

Step 3008: Set Q=Q+R and step 3010 follows ("+" indicates an addition of the points on the elliptic curve).

Step 3009: Set Q=Q−R and step 3010 follows ("−" indicates a subtraction of the points on the elliptic curve).

Step 3010: Set i=i−1.

Step 3011: If i>0, set Q=2Q and step 3006 follows ("2Q" denotes a calculation for doubling of the point Q on the elliptic curve).

Step 3012: Output x coordinate xQ of Q as a common key for decryption.

Step 3013: End

The details of the addition of the points on the elliptic curve in step 3008, the subtraction of the points on the elliptic curve in step 3009, and the calculation for doubling of the point on the elliptic curve in step 3011 have been disclosed in the literature [IEEEP1363].

The procedure of the elliptic curve encrypting/decrypting program 1011 is the same as the method called a binary method which is widely used to obtain a value dR which is scalar times as large as a point on an elliptic curve when it is assumed that the private key partial information $d_A$ 1007 and private key partial information $d_B$ 1008 as an expression of the private key d are set to ($d_A$=d, $d_B$=0), respectively. On the other hand, when expression of the private key d is an expression in which the number of combinations of the bits is the smallest as in the case where the private key partial information $d_A$ 1007 and private key partial information $d_B$ 1008 are set to (the ith bit of $d_A$ 1007, the ith bit of $d_B$ 1008)=(1, 0) or (0, 1), such a procedure is the same as an arithmetic operation by a scalar time arithmetic operating method of a point on an elliptic curve using the optimum addition-subtraction chain known as a method of obtaining the scalar time dR of the point on the elliptic curve at a high speed.

A technique such that a plurality of expressing methods of the private key d are selectively used as mentioned above denotes that the various well-known arithmetic operating methods are selectively used as an arithmetic operating method of obtaining the scalar time arithmetic operation dR of the point on the elliptic curve and the dR is arithmetically operated. Consequently, each of the execution time of the elliptic curve encrypting/decrypting program 1011, the intensity of the electromagnetic wave which is generated, the current consumption, and the like differs every expressing method. Averagely, it is expected that the processing time is almost equal to that in case of using the binary method.

The arithmetic operating method on the elliptic curve using the addition-subtraction chain has been mentioned in
- a literature [ADD-SUB] F. Morain and J. Olivas, "Speeding up the computations on an elliptic curve using addition-subtraction chains", Theoretical Informatics and Applications. Vol. 24, No. 6, 1990.

In the embodiment, by holding again the private key itself by a different expressing method at a proper timing, the information itself to be made secret and the fixed value of the information regarding it do not exist in the IC card. Therefore, for example, even if the attacker can analyze the portion on the bus 1003 along which the information flows when the data held in the data storing unit 1004 is sent to the arithmetic operation processing unit 1002, it is difficult to presume the information to be made secret from the flowing information.

Further, even if a part of the data held in the data storing unit 1004 is analyzed by the attacker by some means, the information to be made secret does not necessarily leak. That is, in the case where the information itself to be made secret has been stored as a fixed value in the data storing unit 1004, if the information of one bit of such a value leaks, it means that a part of the information regarding the information to be made secret leaks. However, if the information is held not as the information itself to be made secret but by a certain expression showing it in accordance with the invention, even if the value of $d_A$ which is an expression of the information d to be made secret and corresponds to the half in the combination of $d_A$ and $d_B$ as data actually held in the data storing unit 1004 leaks completely, no information leaks with respect to the information d itself to be made secret.

This is because the attacker does not know how and by which partial information the information d is expressed and even if he knows that d is expressed by the combination of $d_A$ and $d_B$, a person who does not know how d is expressed by the value of $d_B$ or the combination of $d_A$ and $d_B$ cannot find any relation between d and $d_A$.

In addition, according to the invention, since the information to be made secret is held again by a different expressing method at a proper timing, even if the attacker knows the value of $d_B$ at another time point later, he cannot find any relation between $d_A$ and $d_B$ at different time points, so that the information regarding d does not leak.

Figure 4:
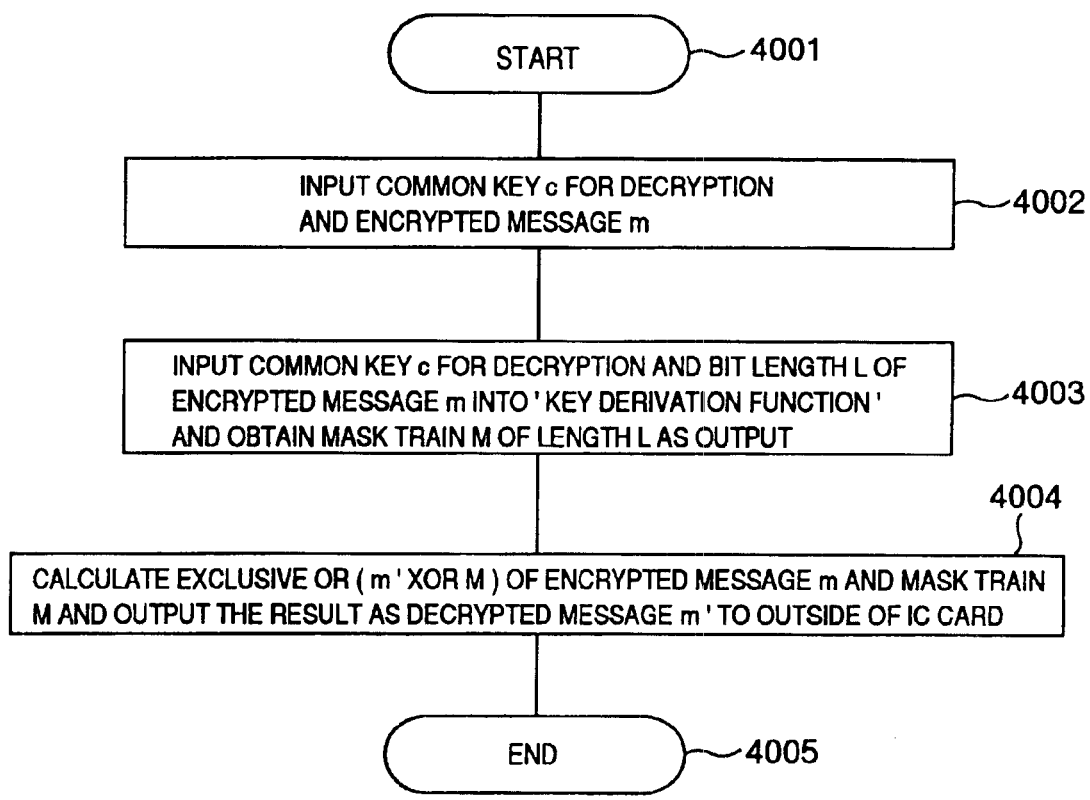
FIG. 4 is a flowchart for a common key encrypting/ decrypting program in the IC card construction of FIG. 1.

FIG. 4 shows a flow for the common key encrypting/decrypting program 1012 in FIG. 1.

Step 4001: Start

Step 4002: A common key c for decryption and the encrypted message m 1014 are inputted. The common key c for decryption is a common key xQ for decryption outputted in step 3012 of the elliptic curve encrypting/decrypting program 1011.

Step 4003: The common key c for decryption and a bit length L of the encrypted message m 1014 are inputted to "key derivation function" and a mask train M of the length L is obtained as an output. The "key derivation function" is a function such as to output a mask train of the length L when the common key c for decryption and the length L of the mask train which is outputted are designated as inputs, and it is assumed that this function has been installed as a part of the common key encrypting/decrypting program 1012. The details of the "key derivation function" have been disclosed in the literature [X9.63].

Step 4004: The exclusive OR of the encrypted message m 1014 and the mask train M (m' XOR M) is calculated and a result is outputted as a decrypted message m' 1015 to the outside of the IC card 1001.

Step 4005: End

Although an example in which the invention is applied to the IC card having a decrypting function of the Elliptic Curve Encryption Scheme (ECES) as a kind of elliptic curve encryption has been shown in the embodiment, the invention can be also widely applied to other media.

For example, the invention can be also applied to an IC card having a decrypting function of the Elliptic Curve Augmented Encryption Scheme (ECAES) instead of the Elliptic Curve Encryption Scheme (ECES). In this case, in addition to the processes in the embodiment, a process for verifying whether the decrypted data is correct or not by using data for message verification called MAC which has previously been sent together with the encrypted data is added. The details of the Elliptic Curve Augmented Encryption Scheme (ECAES) have been disclosed in the literature [X9.63].

Although the elliptic curve on the finite body of the prime number order has been used in the embodiment, an elliptic curve on a finite body of characteristic 2 can be also used. An elliptic curve on another arbitrary finite body can be also used. Although the elliptic curve defined by the equation $y^2=x^3+ax+b$ has been used in the embodiment, an elliptic curve defined by another equation, for example, $by^2=x^3+ax^2+bx$ can be also used. Although the encryption using difficulty of a discrete logarithm problem on the group which is formed by the rational points on the elliptic curve has been used in the embodiment, it is also possible to use an encryption using difficulty of the discrete logarithm problem on another group such as multiplicative group of the finite body, divisor class group on a hyperelliptic curve, divisor class group on a Cab curve, or the like. In case of using those encryptions, it is sufficient that the arithmetic operation based on the secret information of the point on the elliptic curve in the elliptic curve encrypting/decrypting program 1011 is replaced with an arithmetic operation based on the secret information in each group.

Further, even in case of an encryption other than the encryption using the difficulty of those discrete logarithm problems, more generally, even in case of something other than the encryption, the invention can be also applied to an IC card having a function including an arithmetic operation such that there is a certain number to be made secret and a group arithmetic operation is repetitively performed the number of times corresponding to the number to be made secret in a manner similar to that in the embodiment. That is, although dR as a result obtained by executing the arithmetic operation to add R the number of times corresponding to the number to be made secret (private key d) has been obtained in the above elliptic curve encrypting/decrypting program 1011, it is sufficient to express the number to be made secret by a certain expression in a manner similar to the above method and execute an arithmetic operation by the program corresponding to the elliptic curve encrypting/decrypting program 1011. As an example of such an encryption, for example, there is an RSA encryption or the like other than the encryptions using the difficulty of the foregoing discrete logarithm problems. There is an RSA signature or the like as an example of a function other than the encryption. The "group" used here denotes a set and is a group in which an arithmetic operation existing between the elements belonging to such a set has been defined.

The RSA encryption and signature have been disclosed in a literature [APPLIED] Bruce Schneier, "Applied Cryptography", John Wiley & Sons, Inc. 1996.

Although the example in which the invention is applied to the IC card has been shown in the embodiment, the invention can be also widely applied to a media other than the IC card as a technique for more safely preserving information to be made secret. For example, the invention can be also applied to devices other than the IC card, namely, a secure cryptographic device, a semiconductor chip, a PC, or a workstation having the same function.

Second Embodiment

The elliptic curve encrypting/decrypting program 1011 in the first embodiment can be also modified as follows.

Figure 5:
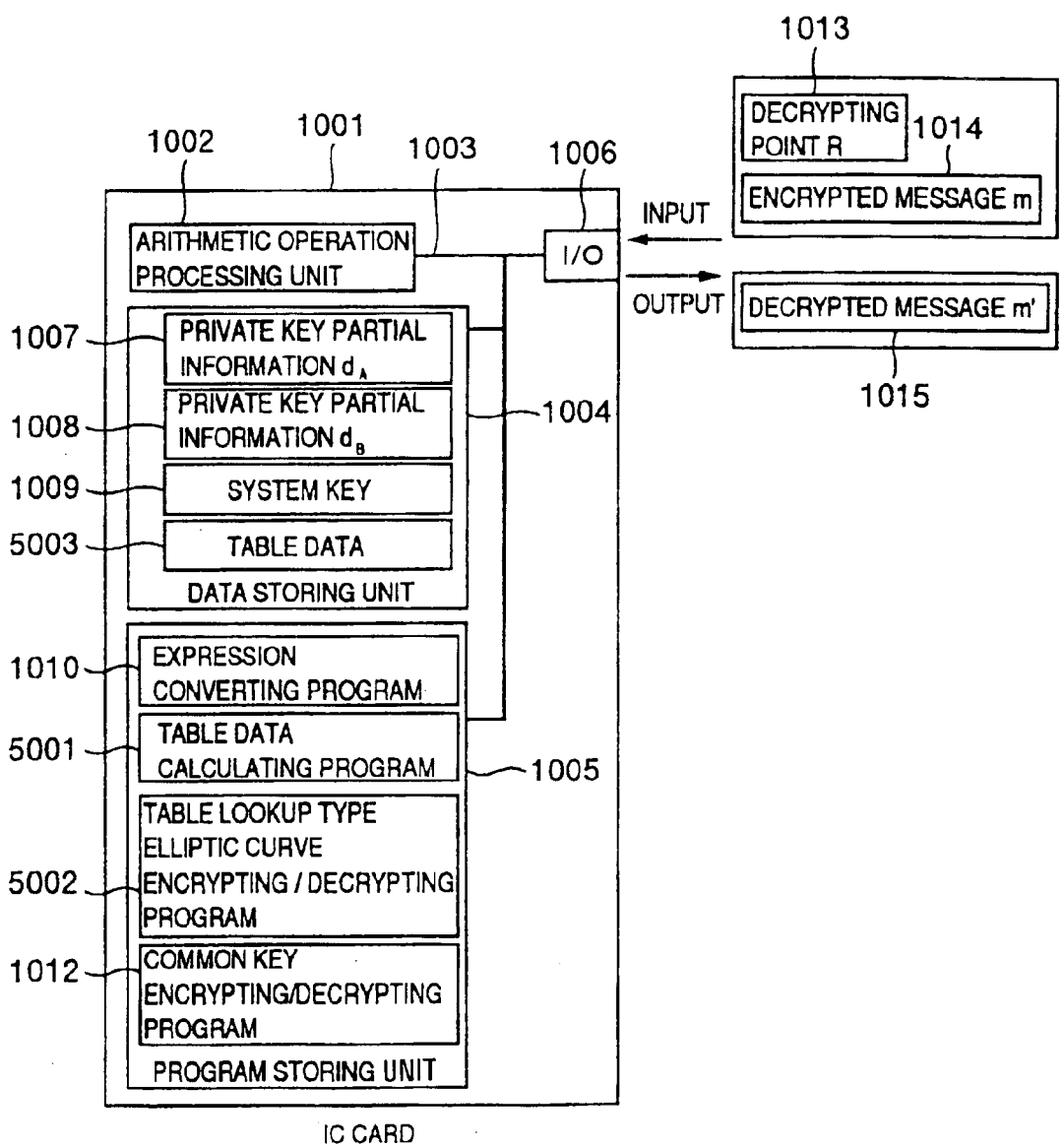
FIG. 5 is a constructional diagram of an IC card in an embodiment of the invention.

FIG. 5 is a constructional diagram of the IC card in the embodiment. In the embodiment, a program corresponding to the elliptic curve encrypting/decrypting program 1011 in the first embodiment comprises the following two programs: a table data calculating program 5001 and a table lookup type elliptic curve encrypting/decrypting program 5002.

An outline of the operation of each program will be described hereinbelow.

The table data calculating program 5001 is a program for inputting the point R 1013 for decryption which is given from the outside of the IC card 1001, calculating the data in a table which is used in the table lookup type elliptic curve encrypting/decrypting program 5002, and writing a calculation result into a table data 5003 area in the data storing unit 1004. This program executes a process which does not depend on the data showing the private key d included in the data storing unit 1004, namely, the private key partial information $d_A$ 1007 and private key partial information $d_B$ 1008 in the embodiment. Therefore, there is no anxiety about the leakage of the data regarding the private key d even if the program is attacked by the TA (Timing Attack), DPA (Differential Power Analysis), SPA (Simple Power Analysis), or the like.

The table lookup type elliptic curve encrypting/decrypting program 5002 is a program for calculating a common key for decryption which is necessary to decrypt the encrypted message m 1014 by the common key encrypting/decrypting program 1012 from the private key partial information $d_A$ 1007 and private key partial information $d_B$ 1008 stored in the data storing unit 1004 and the table data 5003 calculated by the table data calculating program 5001.

The details of the operation of each program will now be described.

Figure 6:
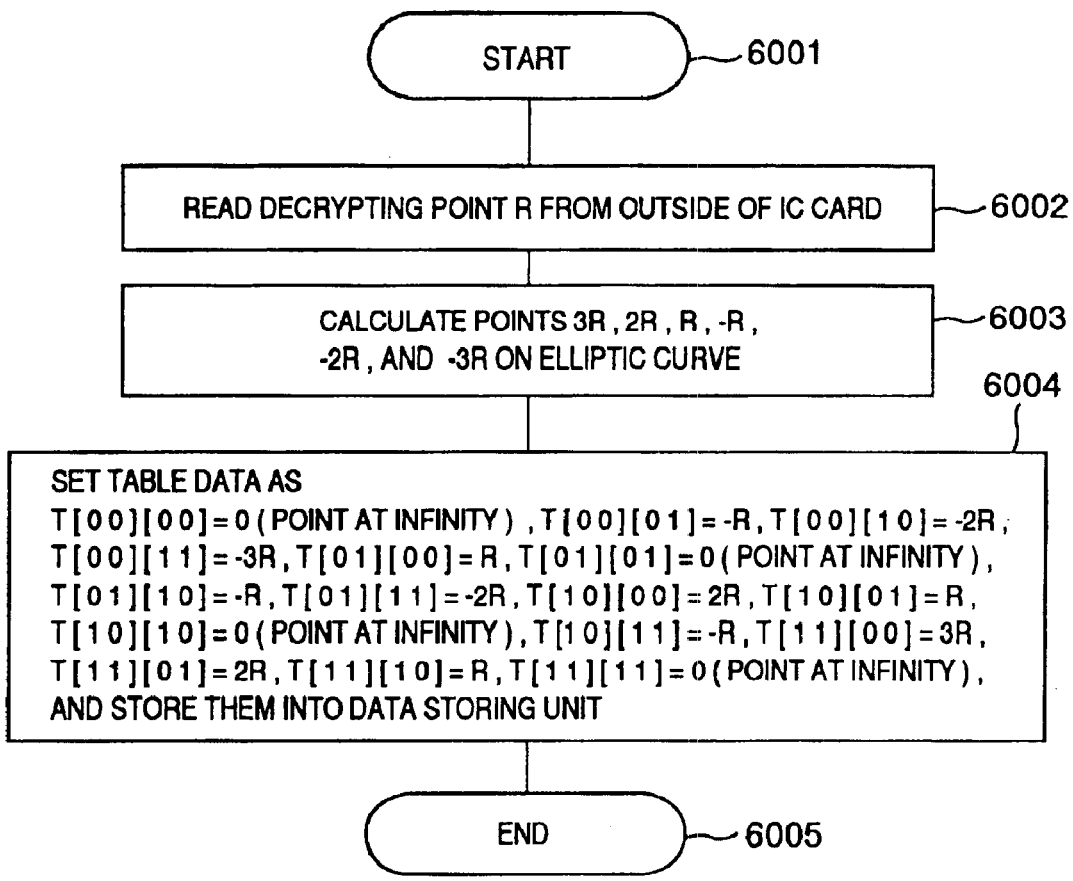
FIG. 6 is a flowchart for a table data calculating program in the IC card construction of FIG. 5.

FIG. 6 shows a flow for the table data calculating program 5001 in FIG. 5.

Step 6001: Start

Step 6002: The point R 1013 for decryption is read out from the outside of the IC card 1001.

Step 6003: Points 3R, 2R, R, −R, −2R, and −3R on the elliptic curve are calculated.

Step 6004: The table data 5003 is set to
T[00][00]=0 (point at infinity)
T[00][01]=−R
T[00][10]=−2R
T[00][11]=−3R
T[10][00]=R
T[01][0]=0 (point at infinity)
T[01][10]=−R
T[01][11]=−2R
T[10][00]=2R
T[10][01]=R
T[10][10]=0 (point at infinity)
T[10][11]=−R
T[11][00]=3R
T[11][01]=2R
T[11][10]=R
T[11][11]=0 (point at infinity) and they are stored in the data storing unit.

Step 6005: End

Figure 7:
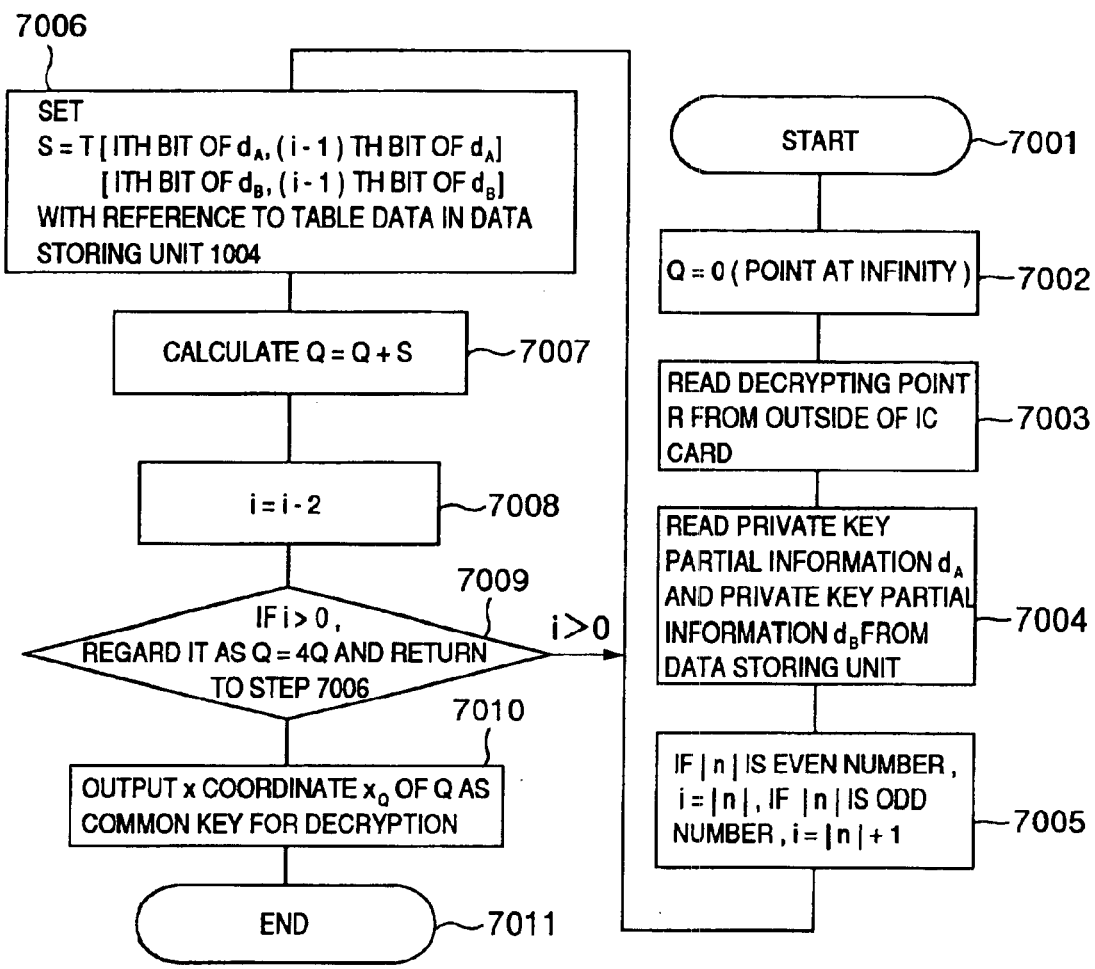
FIG. 7 is a flowchart for a table lookup type elliptic curve encrypting/decrypting program in the IC card construction of FIG. 5.

FIG. 7 shows a flow for the table lookup type elliptic curve encrypting/decrypting program 5002 in FIG. 5.

Step 7001: Start

Step 7002: Set Q=0 (point at infinity)

Step 7003: The point R 1013 for decryption is read out from the outside of the IC card 1001.

Step 7004: The private key partial information $d_A$ 1007 and private key partial information $d_B$ 1008 are read out from the data storing unit 1004.

Step 7005: If $|n|$ is an even number, set i=$|n|$. If $|n|$ is an odd number, set i=$|n|$+1. ($|n|$ is a bit length of order n of the base point P)

Step 7006: With reference to the table data 5003 in the data storing unit 1004, set S=T [the ith bit of $d_A$ 1007, the (i−1)th bit of $d_A$ 1007] [the ith bit of $d_B$ 1008, the (i−1)th bit of $d_B$ 1008](it is now assumed that the least significant bit is set to the first bit and the ith bit is counted so as to increase as it approaches the upper bit).

Step 7007: Q=Q+S is calculated (+denotes an addition of the points on the elliptic curve).

Step 7008: Set i=i−2.

Step 7009: If i>0, set Q=4Q and step 7006 follows (4Q can be obtained by repeating a doubling calculation of point Q on the elliptic curve twice).

Step 7010: Output the x coordinate xQ of Q as a common key for decryption.

Step 7011: End

The details of the addition of the points on the elliptic curve in step 7007 and the doubling calculation of the points on the elliptic curve in step 7009 have been described in the literature [IEEEP1363].

Although the arithmetic operation has been performed to every two continuous bits of the private key partial information in the embodiment, it can be also performed by a method different from it. For example, an arithmetic operation can be performed to every three continuous bits or, generally, can be performed to every t continuous bits or every ($|n|$/j) bits which are away from each other by j bits. It is necessary to change the table data calculating program 5001 to a program for calculating a proper value in accordance with the way of seeing those bits of the private key partial information.

Also in the embodiment, the value of d itself does not appear during the arithmetic operation to obtain dR. Therefore, the time which is required for the arithmetic operation to obtain dR, the intensity of the electromagnetic wave which is generated, and the current consumption do not depend on the value of d itself. Consequently, it is difficult to presume the value of the private key d by an attack by the TA (Timing Attack), DPA (Differential Power Analysis), or the like.

Although the example in which the invention is applied to the IC card having the decrypting function of the Elliptic Curve Encryption Scheme (ECES) as a kind of elliptic curve encryption has been shown in the embodiment, the invention can be also widely applied to other media in a manner similar to the first embodiment. Particularly, in case of applying the invention to an apparatus for performing a process including an arithmetic operation such that a group arithmetic operation to a certain predetermined element is repetitively executed the number of times corresponding to the number to be made secret, there is no need to execute the table data calculating program 5001 every time but it is sufficient to execute it only once. Therefore, the process can be executed at a high speed every time and this method is further effective. In this case, further, the table data can be also calculated outside of the apparatus (in case of the embodiment, IC card 1001). As an example of an apparatus including such a process, for instance, an IC card for performing a key forming process in the elliptic curve encryption can be mentioned. In this case, a process for obtaining the point dP on the elliptic curve from the private key information d formed as random numbers and the base point P as a fixed point is included. Therefore, the table data is calculated, for example, outside of the IC card and can be previously stored in the IC card as a part of the system key information.

Third Embodiment

As a method of storing the table data into the table data 5003 area in the second embodiment, the following method can be used.

Although the point on the elliptic curve is usually expressed by a combination of two values of the x coordinate and y coordinate by using 2-dimensional affine coordinates, in case of performing the addition of the points or the doubling calculation of the points, mainly for the purpose of performing the arithmetic operation at a high speed, such a point can be also expressed by a combination of three values of the x coordinate, y coordinate, and z coordinate. An example of such an expression and an arithmetic operating method of the point on the elliptic curve in case of using such an expression has been disclosed as a projective coordinate in the literature [IEEEP1363]. The mutual conversion between the expression by the 2-dimensional affine coordinates and the expression by the projective coordinate can be performed as follows.

[From the 2-dimensional affine coordinates to the projective coordinate] (x, y)–[x, y, 1]

[From the projective coordinate to the 2-dimensional affine coordinates] [X, Y, Z]–(X/Z$^2$, Y/Z$^3$)

It should be noted here that, according to the expression by the projective coordinate, the expression showing the same point is not limited to one kind. That is, assuming that t is set to a number which satisfies (0<t<p) (p denotes an order of the finite body which is defined by the elliptic curve), the point [X, Y, Z] and the point [t$^2$X, t$^3$Y, tZ] show the same point (X/Z$^2$, Y/Z$^3$).

As a method of storing the table data into the table data 5003 area in the second embodiment, it can be stored by the expression by the projective coordinate. In this case, even in case of the data showing the same point, it can be stored by different expressions. For example, although the data indicative of a point 2R has been stored in T[10][00] and T[11][01], by storing by using those two data by different expressions, namely, by using T[10][00] [X, Y, Z] and T[11][01]=[X', Y', Z'] (where, it is assumed that X/Z$^2$=X'/Z'$^2$, Y/Z$^3$=Y'/Z'$^3$ are satisfied), the arithmetic operating process in the case where T[10][00] is referred to during the execution of the table lookup type elliptic curve encrypting/decrypting program 5002 and that in the case where T[11][01] is referred to are different, so that each of the execution time, the intensity of the electromagnetic wave which is generated, the current consumption, and the like also differs.

Figure 8:
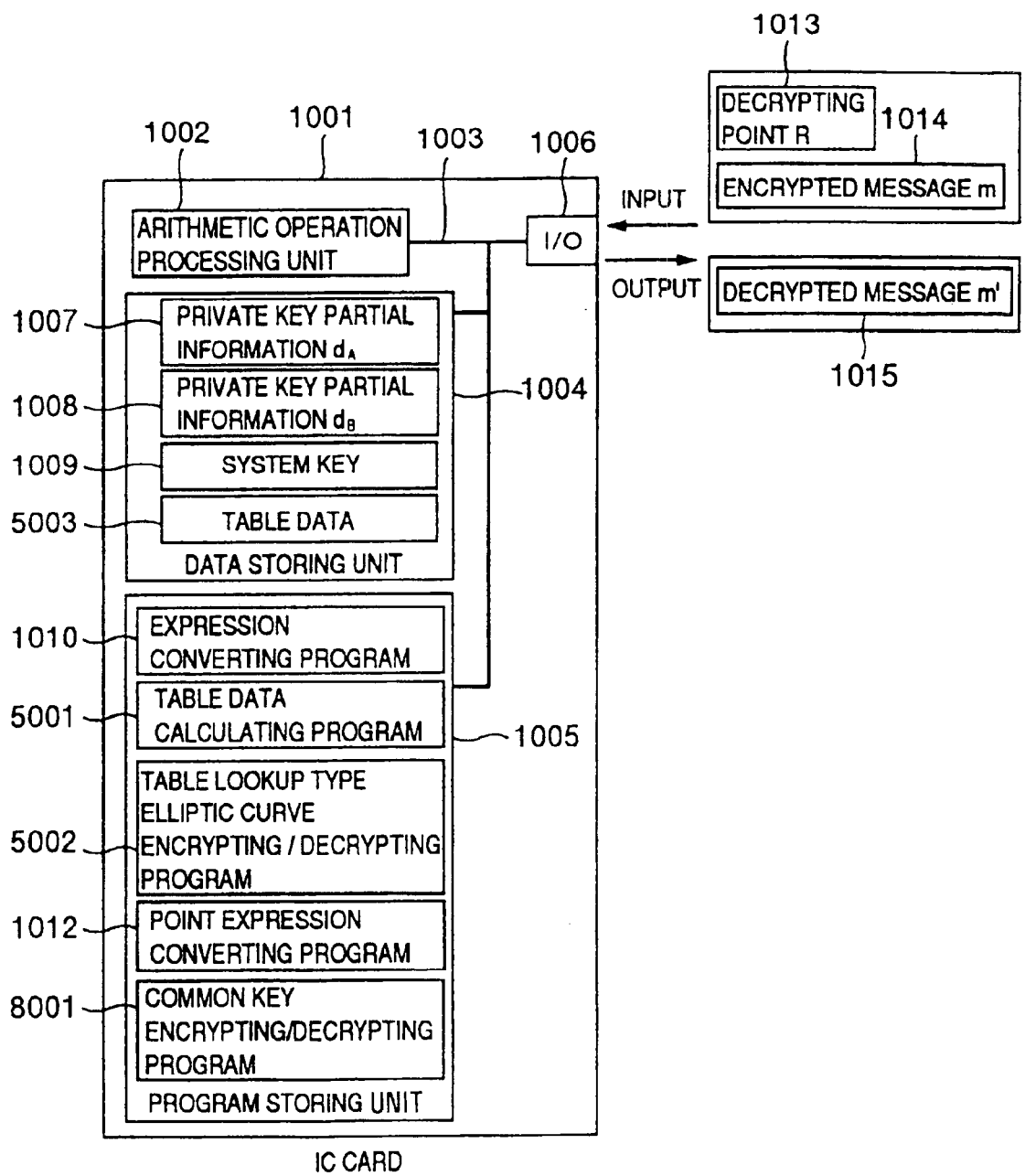
FIG. 8 is a constructional diagram of an IC card in an embodiment of the invention.

FIG. 8 is a constructional diagram of the IC card in the embodiment. In the embodiment, a point expression converting program 8001 is added to the second embodiment.

An outline of the point expression converting program 8001 will now be described hereinbelow.

The point expression converting program 8001 converts the expression of a point in the table data 5003 stored in the data storing unit 1004 and rewrites the table data 5003 by the converted value. It is assumed that the table data 5003 is expressed by the combination of three values of the x coordinate, y coordinate, and z coordinate expressed by the projective coordinate by the table data calculating program 5001 and stored. That is, for example, the data expressed as (x, y) by the 2-dimensional affine coordinates can be converted into [x, y, 1] and stored or when the table data 5003 is calculated in step 6003 of the table data calculating program 5001, it is also possible to calculate it by using the projective coordinate and store a result into the table data 5003 as a projective coordinate as it is. The point expression converting program 8001 can be executed at an arbitrary point for a time interval until the table data 5003 is finally referred to after the table data calculating program 5001 was executed. The program 8001 can be executed any number of times for such a time interval. For example, the program 8001 can be executed just before the table lookup type elliptic curve encrypting/decrypting program 5002 is executed or can be also executed by interrupting during the execution of the table lookup type elliptic curve encrypting/decrypting program 5002 if at least one opportunity such that the table is referred to is left.

The details of the point expression converting program 8001 will now be described.

Figure 9:
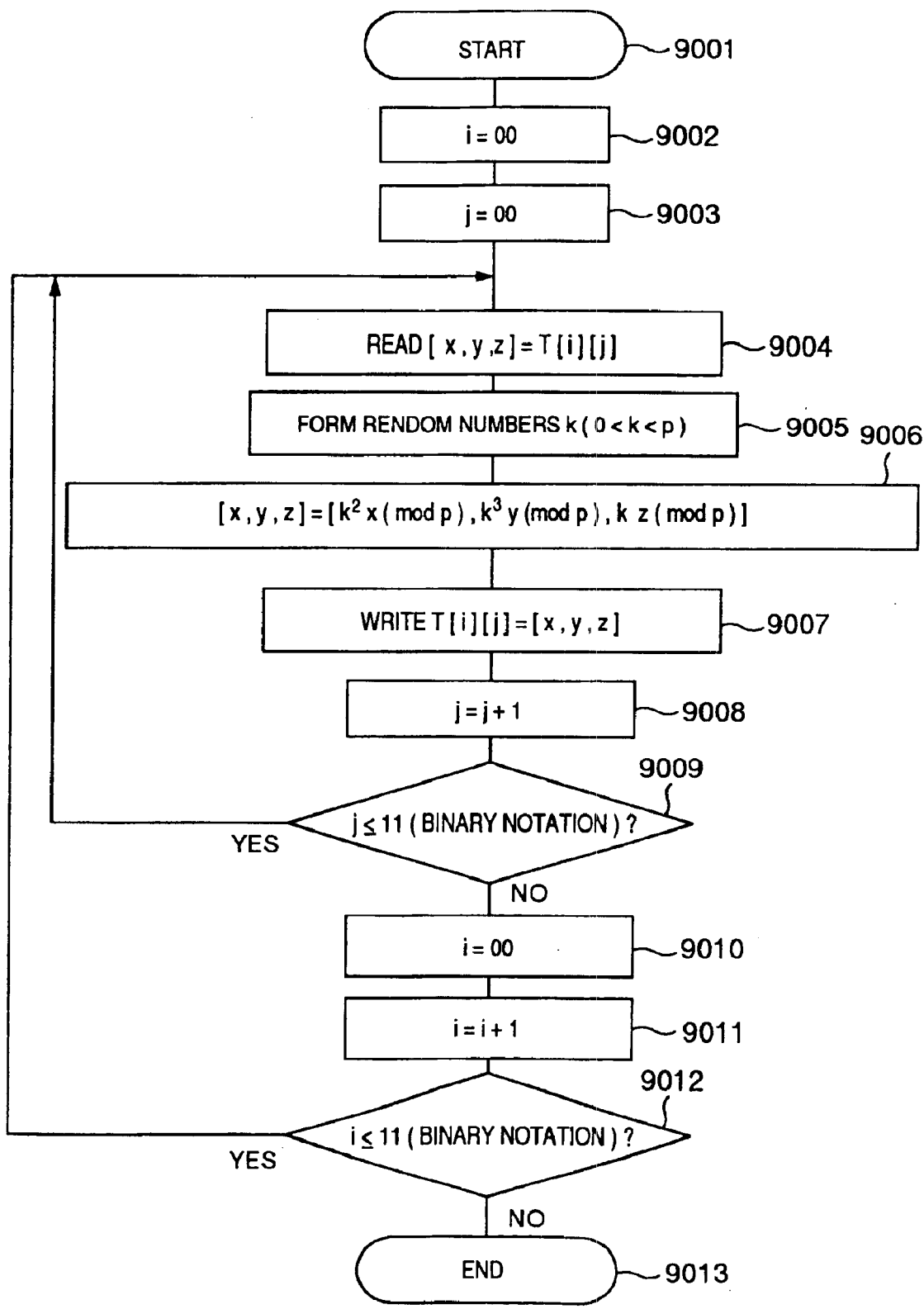
FIG. 9 is a flowchart for a point expression converting program in the IC card construction of FIG. 8.

FIG. 9 shows a flow for the point expression converting program 8001 in FIG. 8.

Step 9001: Start

Step 9002: Set i=00.

Step 9003: Set j=00.

Step 9004: Read [x, y, z]=T[i][j].

Step 9005: Form a random number k (0<k<p. p is an order of the finite body which is defined on the elliptic curve).

Step 9006: Set [x, y, z]=[k$^2$ x (mod p), k$^3$ y (mod p), k z (mod p)] (p is an order of the finite body which is defined on the elliptic curve).

Step 9007: Set T[i][j]=[x, y, z].

Step 9008: Set j=j+1 (j is expressed by the binary notation).

Step 9009: If j≦11 (expressed by the binary notation), step 9005 follows.

Step 9010: Set j=00.

Step 9011: Set i=i+1 (i is expressed by the binary notation).

Step 9012: If i≦11 (expressed by the binary notation), step 9005 follows.

Step 9013: End

In the embodiment, by executing the point expression converting program 8001 at a proper timing, a plurality of data showing the same point, for example, T[10][00] and T[11][01] are stored by the different expressions. Even in case of the same data T[i][j], since it is stored by the different expressions in dependence on the timings for referring to it, the processes including the arithmetic operation to refer to the table data 5003 are different even if the input value is the same every time. Therefore, the processing time, the intensity of the electromagnetic wave which is generated, the current consumption during the process, and the like are not constant. That is, it means that the arithmetic operation using the private key and the table data 5003, the time which is required for execution of the table lookup type elliptic curve encrypting/decrypting program 5002, the intensity of the electromagnetic wave which is generated, and the current consumption are not constant. Therefore, it is difficult to presume the value of the private key by an attack such as TA (Timing Attack), DPA (Differential Power Analysis), or the like.

Although all of the point information included in the table data 5003 has been converted by the point expression converting program 8001 in the embodiment, only the data of one or a plurality of points selected at random can be also converted instead of all points. As a countermeasure against the TA (Timing Attack) or DPA (Differential Power Analysis) for the table lookup type elliptic curve encrypting/decrypting program 5002, it is desirable to convert the expression of many point data and it is also desirable that an execution frequency of the point expression converting program 8001 is large.

Although the example in which the invention is applied to the IC card having the decrypting function of the Elliptic Curve Encryption Scheme (ECES) as a kind of elliptic curve encryption has been shown in the embodiment, the invention can be also widely applied to other media in a manner similar to the second embodiment.

Fourth Embodiment

In the first embodiment, the information to be made secret, namely, the private key d is expressed by the combination of the private key partial information $d_A$ 1007 and private key partial information $d_B$ 1008. More specifically speaking, it is expressed so that the difference in the modulo n between $d_A$ 1007 and $d_B$ 1008 is equalized to the value of the private key d. In the first embodiment, $d_A$ 1007 and $d_B$ 1008 are expressed as numbers which are equal to or larger than 0 and are less than n. However, they can be also expressed by the other methods. For instance, $d_A$ 1007 can be expressed as a number which is equal to or larger than 0 and is less than 2n, or can be also expressed by a combination of three or more numbers such that the sum or difference of them is equal to the value of the private key d.

As another expression, for example, the value of d can be also expressed A an array of 1, 0, and −1 as follows. That is, it is assumed that the expression $(B_n, B_{n-1}, \ldots, B_1, \text{ and } B_0)$ shows the number $2^n B_n + 2^{n-1} B_{n-1} + \ldots + 2^1 B_1 + 2^0 B_0$. It is assumed that $B_i$ is one of 1, 0, and −1. This expression corresponds to the extension of the ordinary binary expression. That is, an expressing method whereby $B_i$ is limited to only 0 or 1 corresponds to the ordinary binary expression. To express 1, 0, and −1 on the memory, a method of expressing 0 in case of 00, 1 in case of 01, and −1 in case of 11 by using two bits is considered.

When this expression is used, the expression converting program 1010 in the first embodiment, for example, is changed as follows. It is assumed that private key information d_rep expressed as an array of 1, 0, and −1 has been stored in the data storing unit 1004 in place of the combination of the private key partial information $d_A$ 1007 and private key partial information $d_B$ 1008.

Extension converting program (extension binary expression)

Step 10001: Start

Step 10002: Read the private key information d_rep from the data storing unit 1004.

Step 10003: Form random numbers K,L (where, 0<K<L<|d_rep|. |d_rep| is a bit length of d_rep).

Step 10004: Set the value $B_{L+1}$ of the (L+1)th bit of the private key information d_rep to $B_{L+1}=B_{L+1}+1$.

Step 10005: For all of i which satisfies $K<i \leq L$, the value $B_i$ of the ith bit of the private key information d_rep is set to $B_i=B_i-1$.

Step 10006: Set the value $B_K$ of the Kth bit of the private key information d_rep is set to $B_K=B_K-2$.

Step 10007: If each bit of the private key information d_rep is equal to one of 1, 0, and −1, step 10013 follows.

Step 10008: Set j=|d_rep|.

Step 10009: If the value $B_j$ of the jth bit of d_rep is equal to 2, set $B_{j+1}=B_{j+1}+1$ and $B_j=0$.

Step 10010: If the value $B_j$ of the jth bit of d_rep is equal to −2, set $B_{j+1}=B_{j+1}-1$ and $B_j=0$.

Step 10011: Set j=j−1.

Step 10012: If j>0, step 10007 follows.

Step 10013: Write the updated private key information d_rep into the data storing unit 1004.

Step 10014: End

The elliptic curve encrypting/decrypting program 1011 in the first embodiment is changed as follows.

Elliptic curve encrypting/decrypting program (extension binary expression)

[Step 3004] is changed as follows.

Step 11004: Read the private key information d_rep from the data storing unit 1004.

[Step 3006] is changed as follows.

Step 11006: If the ith bit $B_i$ of d_repl is equal to 1, step 3009 follows.

[Step 3007] is changed as follows.

Step 11007: If the ith bit $B_i$ of d_repl is equal to −1, step 3010 follows.

Although the value of d is expressed as an array of 1, 0, and −1 in the embodiment, the value of d can be also expressed, for example, as an array of 2, 1, 0, and −1 by similarly using the extension binary expression. The value of d can be also expressed as an array of t, t−1, ..., 0, −1, ..., −s (s, t≧0).

Further, the value of d can be also expressed as an array of several numbers which are not always continuous so long as it can express all values of d.

As another expression of the value of the private key information d, it can be also expressed as a combination of two numbers whose product is equal to d. That is, in place of the combination of the private key partial information $d_A$ 1007 and private key partial information $d_B$ 1008 in the first embodiment, combinations $dm_A$ and $dm_B$ of two numbers in which $dm_A \times dm_B$ (mod n) is equal to the value of the private key information d are stored in the data storing unit 1004, or it can be also expressed by a combination of three or more numbers such that the product is equal to d. Further, it can be also expressed by a combination of a plurality of numbers such that a predetermined arithmetic operation result is equal to the private key information d without limiting to the product. In case of using the expressing method by those various secret information forming information, a desired result is obtained by also using the secret information forming information processing means which can correctly process them.

When the expression by the combination of two numbers such that the product is equal to d is used, the expression converting program 1010 in the first embodiment is changed, for example, as follows.

Expression converting program (product expression)

Step 12001: Start

Step 12002: The random number k which is larger than 0 and is less than n is formed.

Step 12003: Read $dm_A$ and $dm_B$ from the data storing unit 1004.

Step 12004: Calculate $dm_A' = k\, dm_A \pmod{n}$ and $dm_B' = k^{-1} dm_B \pmod{n}$.

Step 12005: Write $dm_A'$ and $dm_B'$ into portions where $dm_A$ and $dm_B$ have been written in the data storing unit 1004, respectively.

Step 12006: End

The elliptic curve encrypting/decrypting program 1011 in the first embodiment is changed as follows.

Elliptic curve encrypting/decrypting program (product expression) (Outline)

Step 13001: Start

Step 13002: Read the point R 1013 for decryption from the outside of the IC card 1001.

Step 13003: Read $dm_A$ and $dm_B$ from the data storing unit 1004

Step 13004: Calculate $Q = dm_A\, R$.

Step 13005: Calculate $Q = dm_B\, Q$.

Step 13006: Output the x coordinate xQ of Q as a common key for decryption.

Step 13007: End

The scalar time arithmetic operation of the point on the elliptic curve in steps 13004 and 13005 can be performed by an arbitrary method. For example, it can be performed by using the binary method or can be performed by using the method shown in another embodiment by regarding that $dm_A$ and $dm_B$ are the values of the private key themselves.

Although several examples of the expressing method of expressing the secret information have been shown above, they can be also combined. For example, it is also possible to use a construction such that a plurality of expressions by the different or same expressing method are stored in the data storing unit 1004 and when the arithmetic operation using the secret information is actually performed, one or a plurality of expressions among them are selected at random and the arithmetic operation is performed by them. It is also possible to use a construction such that a plurality of processing means for processing those expressions are stored and, when the arithmetic operation using the secret information is actually performed, one or a plurality of processing means are selected at random and the arithmetic operation is performed by them.

The secret information is preliminarily dispersed to n information so that the original information can be reconstructed by a method called a secret dispersion when k of n information are collected, and those n information is used as an expression of the secret information.

The secret dispersion has been disclosed in a literature [Shamir] Adi Shamir, "How to Share a Secret", Communications of the ACM, Vol. 22, No. 11, pp. 612–613, 1979.

By those means, it is possible to set such that the time which is required when the arithmetic operation using the information to be secretly stored is performed, the intensity of the electromagnetic wave which is generated, and the current consumption are not constant, and it is difficult to presume the value of the private key by the TA (Timing Attack), DPA (Differential Power Analysis), SPA (Simple Power Analysis), or the like.

Although the example in which the invention is applied to the IC card having the decrypting function of the Elliptic Curve Encryption Scheme (ECES) as a kind of elliptic curve encryption has been shown in the embodiment, the invention can be also widely applied to other media in a manner similar to the first embodiment.

Fifth Embodiment

Although the example in which the invention is applied to, mainly, the process for calculating dR for the private key d and the given point R on the elliptic curve has been shown in the first to fourth embodiments, the invention is also effective even for the other processes.

An embodiment in which the invention is applied to an IC card having a signature forming function of an ECDSA signature as a digital signature system using an elliptic curve will now be described hereinbelow with reference to the drawings. The ECDSA signature has been disclosed in not only the above literature [IEEEP1363] but also a literature [X9.62] "Working Draft AMERICAN NATIONAL STANDARD X9.62-1998, Public Key Cryptography For The Financial Services Industry: The Elliptic Curve Digital Signature Algorithm (ECDSA)", American National Standards Institute, Sep. 20, 1998.

In the embodiment, the information corresponding to the information to be secretly stored is a private key which is necessary to make an ECDSA signature. In the embodiment, it is assumed that the elliptic curve on the finite body of the prime number order is used.

Figure 10:
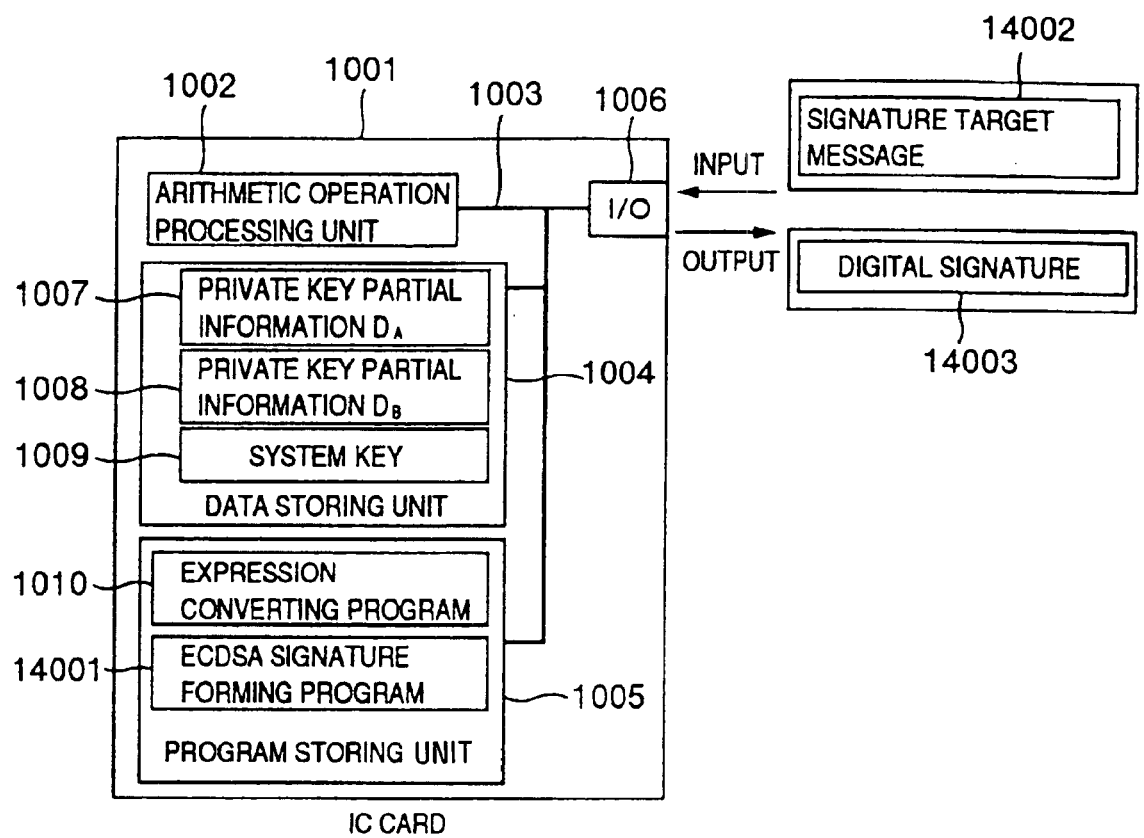
FIG. 10 is a constructional diagram of an IC card in an embodiment of the invention.

FIG. 10 is a constructional diagram of the IC card in the embodiment. Different points from FIG. 1 as a constructional diagram of the IC card in the first embodiment are that the elliptic curve encrypting/decrypting program 1011 and common key encrypting/decrypting program 1012 are not provided in FIG. 10, that an ECDSA signature forming program 14001 is provided in FIG. 10, that an input and an output to/from the IC card 1001 are different, and that the information shown by the combination of the private key partial information $d_A$ 1007 and private key partial information $d_B$ 1008 denotes a private key for making the ECDSA signature instead of a private key for decrypting the elliptic curve encryption in FIG. 10. The elements which are common to those in FIG. 1 are designated by the same reference numerals.

The ECDSA signature forming program 14001 will be described.

The ECDSA signature forming program 14001 inputs a signature target message 14002 from the outside of the IC card 1001, inputs the private key partial information $d_A$ 1007 and private key partial information $d_B$ 1008 from the data storing unit 1004, calculates a digital signature 14003, and outputs it to the outside of the IC card 1001. The digital signature to the electronic signature target message corresponds to a print of a seal to a paper document and becomes a proof showing that the signer, namely, the owner of the private key guaranteed the contents of the signature target message. The details of the ECDSA signature have been disclosed in the literature [X9.62].

A flow of the fundamental operation by the expression converting program 1010 and ECDSA signature forming program 14001 at the time when a signature is made in response to the signature, target message 14002 in case of using the IC card 1001 will be summarized as follows.

First, the ECDSA signature forming program 14001 calculates the digital signature 14003 from the signature target message 14002 as an input from the outside of the IC card 1001 and the private key partial information $d_A$ 1007 and private key partial information $d_B$ 1008 stored in the data storing unit 1004 without obtaining the private key d and outputs it to the outside of the IC card 1001.

Thus, the digital signature can be made.

As mentioned above, since the digital signature 14003 can be made without allowing the private key d to appear in the data storing unit 1004, bus 1003, and arithmetic operation processing unit 1002, it is difficult to presume the value of the private key by the TA (Timing Attack), DPA (Differential Power Analysis), SPA (Simple Power Analysis), or the like.

In the example, the values of the private key partial information $d_A$ 1007 and private key partial information $d_B$ 1008 stored in the data storing unit 1004 are fixed. Therefore, each time the signature is made, the private key partial information $d_A$ 1007 and private key partial information $d_B$ 1008 as fixed values are supplied every time from the data storing unit 1004 to the arithmetic operation processing unit 1002 via the bus 1003. The ECDSA signature forming program 14001 performs the calculation by using the same value every time. Therefore, the calculation time, the intensity of the generated electromagnetic wave, the current consumption, and the like for such a period of time also depend on those fixed values. It means that there is a possibility that the value of the private key partial information is presumed by the TA (Timing Attack), DPA (Differential Power Analysis), SPA (Simple Power Analysis), or the like.

In the invention, the expression converting program 1010 is used as a further countermeasure against those attacks in a manner similar to the first embodiment. That is, since the values of the private key partial information $d_A$ 1007 and private key partial information $d_B$ 1008 are rewritten to the other values by executing the expression converting program 1010, the data flowing from the data storing unit 1004 to the arithmetic operation processing unit 1002 via the bus 1003, and each of the time which is required when the ECDSA signature forming program 14001 is executed by the arithmetic operation processing unit 1002, the intensity of the electromagnetic wave which is generated, the current consumption, and the like are also made different. Thus, it is possible to make it further difficult to presume the value of the private key by the TA (Timing Attack), DPA (Differential Power Analysis), SPA (Simple Power Analysis), or the like.

The expression converting program 1010 can be executed every time just before the ECDSA signature forming program 14001 is executed, can be also executed every time just after the ECDSA signature forming program 14001 was executed, can be also executed each time the ECDSA signature forming program 14001 was executed several times, or can be executed at a random timing irrespective of the execution of the ECDSA signature forming program 14001. As a countermeasure against the TA (Timing Attack) or DPA (Differential Power Analysis) for the ECDSA signature forming program 14001, it is desirable that an execution frequency of the expression converting program 1010 is large.

The details of the ECDSA signature forming program 14001 will now be described.

Figure 11:
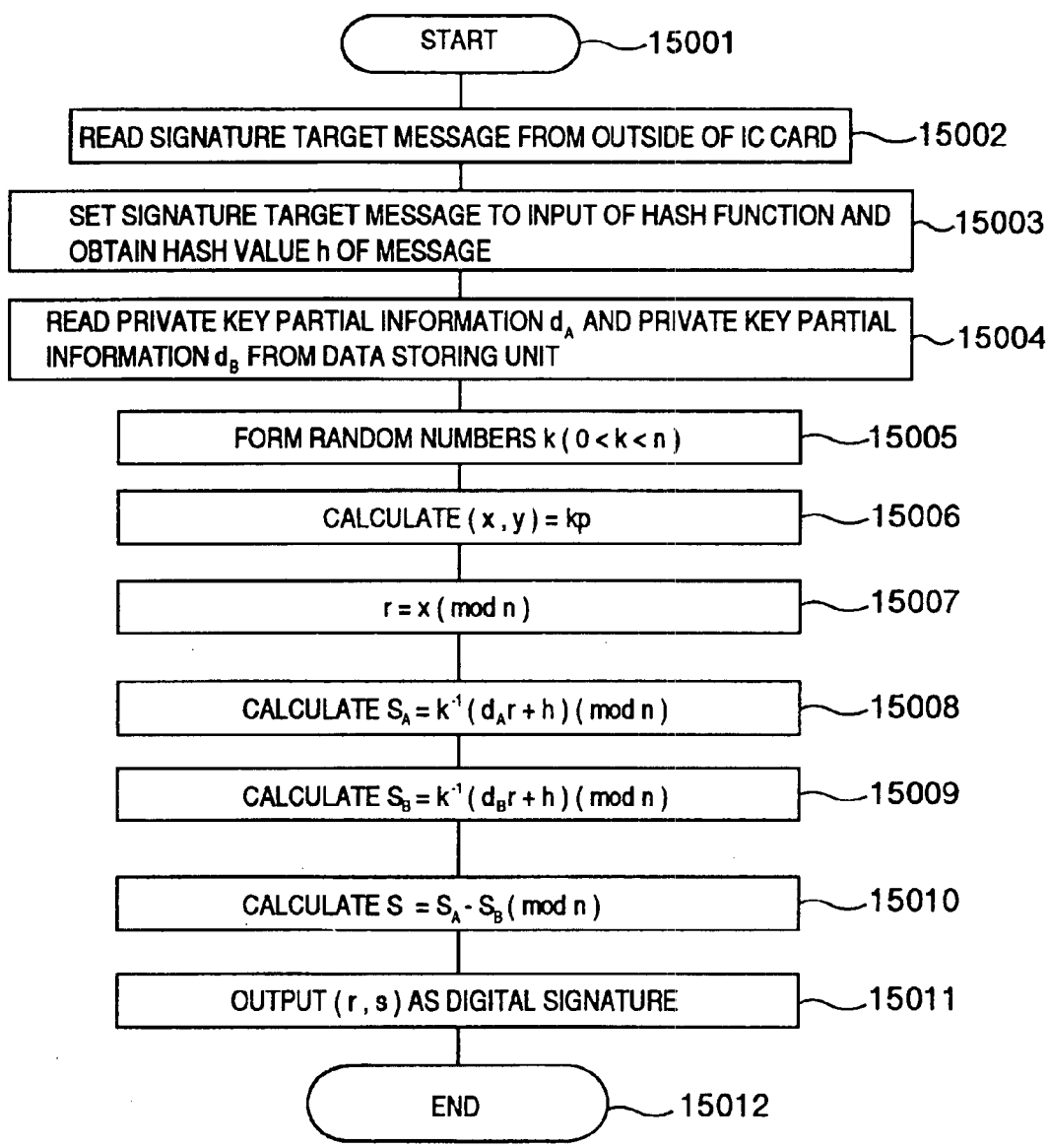
FIG. 11 is a flowchart for an ECDSA signature forming program in the IC card construction of FIG. 12 is a system diagram in an embodiment of the invention

FIG. 11 shows a flow for the ECDSA signature forming program 14001 in FIG. 10.

Step 15001: Start

Step 15002: Read the signature target message 14002 from the outside of the IC card 1001.

Step 15003: Obtain a Hash value h of the message by using the signature target message 14002 as an input of a Hash function.

Step 15004: Read the private key partial information $d_A$ 1007 and private key partial information $d_B$ 1008 from the data storing unit 1004.

Step 15005: Form the random number k (0<k<n).

Step 15006: Calculate (x, y) kP.

Step 15007: Set r=x (mod n).

Step 15008: Calculate $s_A = k^{-1}(d_A r + 2h)$ (mod n).

Step 15009: Calculate $s_B = k^{-1}(d_B r + h)$ (mod n).

Step 15010: Calculate $s = s_A - s_B$ (mod n).

Step 15011: Output (r, s) as a digital signature.

Step 15012: End

It should be noted here that although the value itself of the private key d, namely, $d_A - d_B$ (mod n) never appears in the ECDSA signature forming program 14001, since s obtained as a result satisfies $$s = s_A - s_B \pmod{n}$$
$$= k^{-1}(d_A r + 2h) - k^{-1}(d_B r + h) \pmod{n}$$
$$= k^{-1}(dr + h) \pmod{n},$$

the same result as that obtained by calculating by using the private key d is derived.

As mentioned above, even in the embodiment, an effect similar to that in the embodiment is obtained by performing the process which utilizes a point that the private key has been separated into $d_A$ and $d_B$ and stored. This is because even if the private key is separated into the private key partial information and stored, for example, if the ECDSA signature is once made by using the value of d obtained by the calculation of $d = d_A - d_B$, the effect is reduced.

Further, by changing the combination of the private key partial information $d_A$ 1007 and private key partial information $d_B$ 1008 as an expression of the private key d by the expression converting program 1010 in a manner similar to the first embodiment, the execution time, the intensity of the generated electromagnetic wave, and the current consumption in the ECDSA signature forming program 14001, in more details, a multiplication $d_A r$ in step 15008 and a multiplication $d_B r$ in step 15009 of the ECDSA signature forming program 14001 do not depend on the value of the private key d itself. Therefore, such an effect that it is further difficult to presume the value of the private key by the attack such as TA (Timing Attack), DPA (Differential Power Analysis), or the like is obtained.

Although the Hash value as a message digest of the signature target message is obtained in the IC card 1001 in step 15003 of the ECDSA signature forming program 14001 in the embodiment, this process can be also executed by an external apparatus which can transmit and receive information to/from the IC card 1001, for example, a PC or the like which can transmit and receive information to/from the IC card 1001 via an IC card reader/writer. In this case, the Hash value of the signature target message is inputted to the IC card.

In the embodiment, the random number k which is formed in step 15005 of the ECDSA signature forming program 14001 is also a value to be held secret. This is because there is a relation of $s = k^{-1}(dr + h)$ (mod n) among the digital signature (r, s), private key d, random number k, and Hash value h, and r, s, and h among them are set to values which can be known by everyone. This is because if the value of the random number k is known, the value of the private key d is also known by the calculation.

Since there is a difference with respect to a point that although the value of the private key d is constant, the random number k is formed at random each time the signature is made, a possibility that the value is presumed by the attack such as TA (Timing Attack), DPA (Differential Power Analysis), or the like is lower than that of the private key. A point that the value of the private key d is constant does not correspond to the specific expression but denotes the contents of the information which is inherently possessed.

The invention can be also applied to the random number k in order to further improve the safety. For example, the following operation can be performed in a manner similar to the second embodiment. That is, the table data is preliminarily calculated by the table data calculating program 5001 in the second embodiment. In the embodiment, since it is a table regarding the base point P as a fixed point, the table data can be previously calculated, for example, outside of the IC card 1001 as mentioned in the description in the second embodiment.

After the random number k was formed in step 15005 of the ECDSA signature forming program 14001, it is expressed as a combination of $k_A$ and $k_B$, stored in the data storing unit 1004, and further converted by the expression converting program. After that, (x, y) in step 15006 of the ECDSA signature forming program 14001 is calculated in a manner similar to the table lookup type elliptic curve encrypting/decrypting program 5002 in the second embodiment. It is sufficient that the value $k^{-1}$ which is used in steps 15008 and 15009 of the ECDSA signature forming program 14001 is calculated, for example, as follows. First, $t=k_B^{-1}-k_A^{-1}$ (mod n) is calculated. Subsequently, $t^{-1}k_A^{-1}k_B^{-1}$ (mod n) is calculated. It is equal to $k^{-1}$.

It should be noted that the value of k itself does not appear in the arithmetic operation to obtain $k^{-1}$. Thus, the time which is required for the arithmetic operation to obtain $k^{-1}$, the intensity of the generated electromagnetic wave, and the current consumption do not depend on the value of k itself. Therefore, it is difficult to presume the value of the random number k by the attack such as TA (Timing Attack), DPA (Differential Power Analysis), or the like.

Although the example in which the invention is applied to the IC card having the signature forming function of the ECDSA signature as a kind of digital signature has been shown in the embodiment, the invention can be also widely applied to other media.

For example, as an elliptic curve which is used, another elliptic curve described in the first embodiment can be also used. The invention is not limited to the digital signature using the difficulty of the discrete logarithm problem on the elliptic curve but can be also applied to a digital signature using the difficulty of the discrete logarithm problem on the other groups mentioned in the first embodiment.

More generally, when there is a homomorphic mapping f from a group G1 to a group G2 and there is an apparatus for calculating an element f(g) of the group G2 from an element g of the group G1 to be secretly held instead of the digital signature, a possibility that g is presumed by the TA (Timing Attack), DPA (Differential Power Analysis), SPA (Simple Power Analysis), or the like for such an apparatus can be reduced, for example, as follows according to the invention.

First, g is expressed by a combination of g1 and g2 which satisfy g=g1·g2 (·denotes an arithmetic operation of the group G1) and stored in the data storing unit.

Subsequently, with respect to an element h of G1 selected at random, a program for calculating g1'=h·g1 and g2'=h$^{-1}$·g2 (h$^{-1}$ indicates an inverse element of h regarding an arithmetic operation of the group G1) and replacing g1 with g1' and g2 with g2' is executed. This program is called an expression converting program. Finally, f(g1)#f(g2) (# denotes an arithmetic operation of the group G2) is calculated to obtain the value of f(g). Since f denotes the homomorphic mapping, f(g1)#f(g2) is equal to f(g).

As mentioned above, each time the expression converting program is properly executed, each of the time which is required for the subsequent process to obtain the value of f(g), the intensity of the generated electromagnetic wave, and the current consumption is made different. Thus, it is difficult to presume the value of the private key by the TA (Timing Attack), DPA (Differential Power Analysis), SPA (Simple Power Analysis), or the like. The homomorphic mapping is a mapping from the group to the group and is a mapping such as to keep the arithmetic operation.

Sixth Embodiment

An embodiment in which the invention is applied to the transmission and reception of a message in an electronic commerce will now be described hereinbelow with reference to the drawings.

Figure 12:
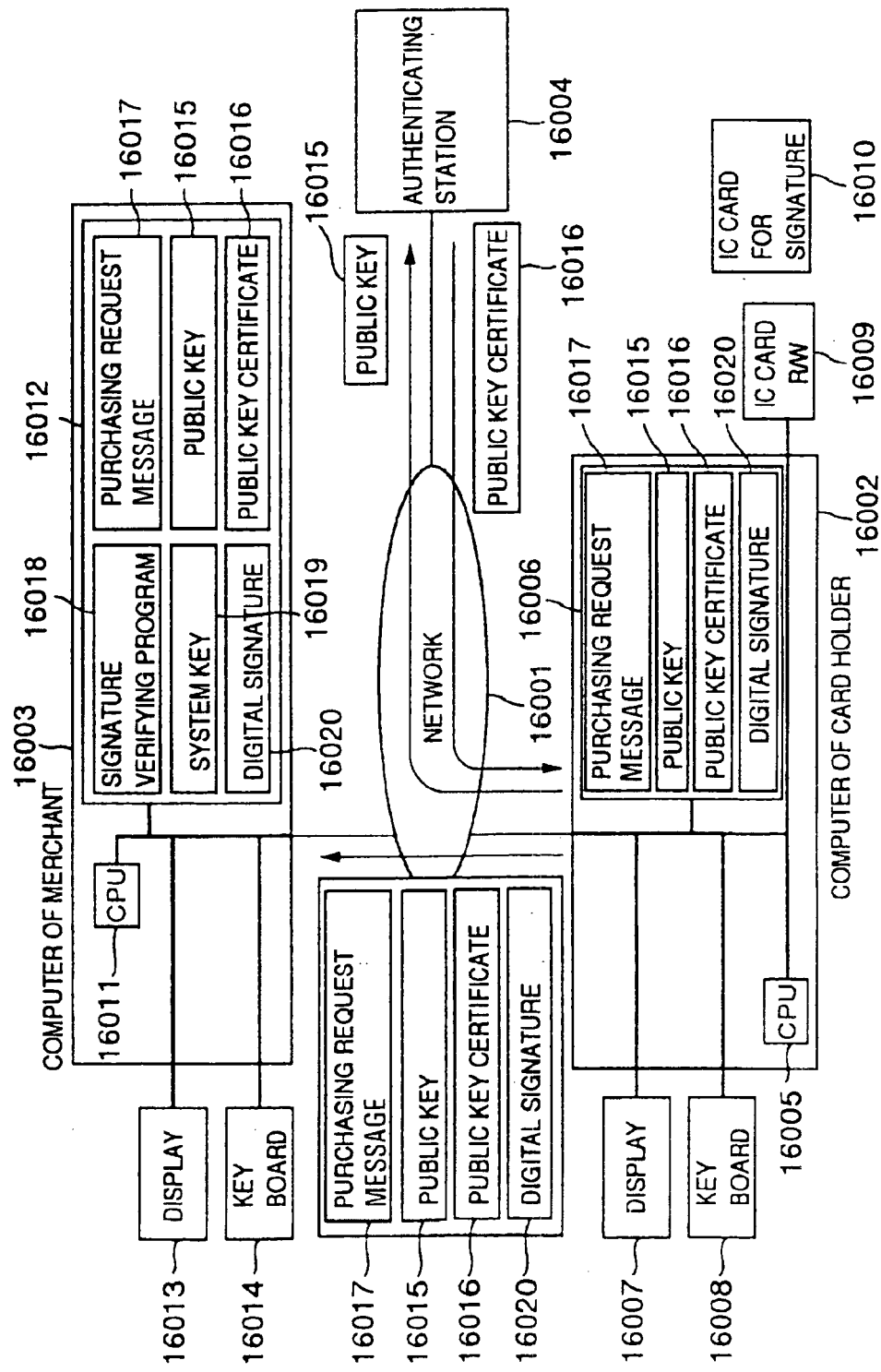

In the following embodiment, processes in the case where a card holder as a general consumer issues a purchasing request of goods to a merchant as a shop will be described. FIG. 12 is a system constructional diagram in the embodiment. In FIG. 12, a computer 16002 of the card holder as a general consumer, a computer 16003 of the merchant as a shop, and an authenticating station 16004 are connected to the network 16001. The authenticating station is facilities for issuing a certificate to guarantee the validity of the public key.

The computer 16002 of the card holder comprises a CPU 16005 and a memory 16006. A display 16007, a keyboard 16008, and an IC card reader/writer 16009 are connected to the computer 16002. The computer 16002 is connected to the network 16001. The card holder owns an IC card 16010 for signature. The IC card 16010 for signature and computer 16002 can transmit and receive information through the IC card reader/writer 16009. The IC card 16010 for signature is the same as the IC card shown in the fifth embodiment.

The computer 16003 of the merchant comprises a CPU 16011 and a memory 16012. A display 16013 and a FU keyboard 16014 are connected to the computer 16003. The computer 16003 is connected to the network 16001.

A public key 16015 has been stored in the memory 16006 of the computer 16002 of the card holder in a form to which the invention is applied. Information and a program regarding the private key which forms a pair together with the public key 16015 have been stored in a memory of the IC card 16010 for signature owned by the card holder in a form to which the invention is applied. Those information is set by a method whereby an IC card in which the information and program regarding the private key have previously been written and a recording medium such as FD, CD-ROM, or the like in which the public key information has been stored are sent from a card issuer, for example, a credit company. The public key information can be also sent from a transmission medium in a wired/wireless manner or the like. A key forming function is built in the IC card sent from the card issuer and the card holder executes such a function, so that the public key information can be also set. A key forming program which can be executed on the computer of the card holder is sent from the card issuer by a recording medium such as FD, CD-ROM, or the like or a transmission medium in a wired/wireless manner or the like, the card holder executes such a program, and the public key information can be also set into the IC card which is sent. In case of the method of using the IC card with the key forming function, since the information regarding the private key does not leak to the outside of the IC card, this method is most desirable from a viewpoint of security. It is assumed that the private key in the IC card has been stored by the storing method to which the invention is applied in a manner similar to the fifth embodiment. The expressing method of the secret information by the secret information forming information to which the embodiment is applied and the program for processing the secret information forming information can be made different in dependence on each IC card or can be made coincident. The safety is further improved by making them different.

A signature verifying program 16018 and a system key 16019 have previously been set in the memory 16012 of the computer 16003 of the merchant. It is assumed that they have been preset in correspondence to the IC card 16010 for signature owned by the card holder. The details of the signature verifying program 16018 have been disclosed in the literature [X9.62].

Processes which are executed by the card holder will now be described.

The card holder first sends the public key 16015 in order to request the authenticating station 16004 to issue a public key certificate 16016. In response to the request from the card holder, the authenticating station 16004 issues the public key certificate 16016 by a well-known method and sends it to the computer 16002 of the card holder. This process is a process which is necessary only once for one public key. In other words, such a process is not necessary each time the process for transmitting a purchasing request message is executed. Since a step of forming a digital signature is included in a procedure for issuing the public key certificate by the authenticating station, the invention can be also applied to such a step.

Processes in the case where the card holder transmits the purchasing request message to the merchant will now be described.

The computer 16002 of the card holder forms a purchasing request message 16017 and stores it into the memory 16006. The purchasing request message 16017 is sent to the IC card 16010 for signature via the IC card reader/writer 16009, thereby forming a digital signature 16020 in accordance with the method of the invention. The digital signature 16020 is also stored in the memory 16006.

The digital signature 16020 becomes a proof showing the fact that the contents of the purchasing request message 16017 was certainly confirmed by the card holder and corresponds to a print of a seal in the ordinary paper document. That is, the private key stored in the IC card 16010 for signature corresponds to the seal to the ordinary paper document. Therefore, if a person with a malice finds out the private key stored in the IC card 16010 for signature, he pretends to be a card holder as a legal owner and can request a purchase.

According to the embodiment, it is difficult to presume the private key by those attacking methods to the IC card for signature as mentioned above.

After the computer 16002 of the card holder formed the digital signature 16020, it collectively sends the purchasing request message 16017, public key 16015, public key certificate 16016, and digital signature 16020 as a transmission sentence 16021 to the merchant via the network 16001.

When the transmission sentence 16021 is received, the merchant first confirms that the public key 16015 is legal by using the public key certificate 16016 by a well-known method and, thereafter, executes the signature verifying program 16018, thereby discriminating whether the purchasing request message 16017 was certainly formed by the card holder or not by using the digital signature 16020, public key 16015, system key 16019, or the like. Thus, if the validity of the digital signature 16020 is confirmed, it is regarded that the contents of the purchasing request message 16017 are reliable, and the transaction is continued. If the validity of the digital signature 16020 is not confirmed, it is regarded that there is some illegality such that it was altered in the network 16001, the purchasing request message 16017 was formed by a person other than the legal card holder, or the like, so that the transaction is stopped.

INDUSTRIAL APPLICABILITY

According to the invention, it is possible to provide an arithmetic operating method and an information holding method which are safe from various attaching methods and an ic card, a security module, a semiconductor chip, a system, a computer, and a program using those methods.

What is claimed is:

1. A processing apparatus of secret information constructed by an arithmetic operation processing circuit, a storing circuit, and a signal line connecting said processing and storing circuits, in which said processing apparatus of the secret information obtains a same processing result as would be obtained by processing the secret information and data as a processing target by a conventional processing method, wherein said storing circuit holds:

secret information forming information different from said secret information, and secret information forming information processing means for outputting said processing result by using said secret information forming information and said data serving as a processing target without allowing said secret information to appear in said arithmetic operation processing circuit, said storing circuit, and said signal line, and said arithmetic operation processing circuit executes said secret information forming information processing means, wherein said storing circuit further has converting means for converting said secret information forming information into another secret information forming information, and said another secret information forming information is information for allowing said secret information forming information processing means to output said same processing result.

2. An apparatus according to claim 1, wherein said secret information is a private key for decrypting or forming a digital signature in a public key encryption technique.

3. An apparatus according to 1, wherein said arithmetic operation processing circuit executes said converting means at a predetermined timing.

4. An apparatus according to claim 1, wherein said storing circuit holds said secret information forming information as a plurality of secret information partial information.

5. A processing program of secret information in a processing apparatus constructed by an arithmetic operation processing circuit, a storing circuit, and a signal line connecting said processing and storing circuits, in which said processing program of the secret information obtains a same processing result as would be obtained by processing the secret information and data as a processing target by a conventional processing method, wherein said arithmetic operation processing circuit is allowed to output said processing result by using secret information forming information different from said secret information and said data serving as a processing target without allowing said secret information to appear in said arithmetic operation processing circuit, said storing circuit, and said signal line, and converting means for converting said secret information forming information into another secret information forming information, wherein said processing program of secret information outputs said same processing result by using said another secret information forming information.

6. A program according to claim 5, wherein said processing program of secret information processes a plurality of secret information partial information as said secret information forming information.

7. A program according to claim 5, wherein said secret information is a private key for decrypting or forming a digital signature in a public key encryption technique.

8. A program according to claim 5, wherein said arithmetic operation processing circuit executes said converting means at a predetermined timing.

9. A processing system of secret information for transmitting and receiving a processing result by using a processing apparatus of secret information constructed by an arithmetic operation processing circuit, a storing circuit, and a signal line connecting said processing and storing circuits, in which said processing result obtained by said processing apparatus of the secret information is the same as would be obtained by processing the secret information and data as a processing target by a conventional processing method, wherein said storing circuit holds:
    secret information forming information different from said secret information, and
    secret information forming information processing means for outputting said processing result by using said secret information forming information and said data serving as a processing target without allowing said secret information to appear in said arithmetic operation processing circuit, said storing circuit, and said signal line, and said arithmetic operation processing circuit executes said secret information forming information processing means, wherein said storing circuit further has converting means for converting said secret information forming information into another secret information forming information, and said another secret information forming information is information for allowing said secret information forming information processing means to output said same processing result, wherein an apparatus on a receiver side of said processing result has means for setting said secret information forming information processing means and said secret information forming information into said storing circuit of said processing apparatus, and an apparatus on a user side of the processing apparatus comprises means for inputting the data serving as a processing target to said processing apparatus, means for receiving said processing result from said processing apparatus, and means for transmitting said received processing result to said receiver side apparatus.

10. An apparatus for processing secret information, comprising:
    a storing circuit holding secret information forming information having relationship with regard to said secret information and being able to form said secret information, and
    an arithmetic operation processing circuit which comprises:
    conversion means for converting said secret information forming information to other secret information forming information having relationship with regard to said secret information and used to form said secret information;
    processing means for executing a step of calculating a latest intermediate data for one or a plurality of times and a step of calculating a processing result by using the latest intermediate data,
    wherein said step of calculating the latest intermediate data comprises:
        a step of calculating the latest intermediate data different from said secret information by using a processing target, said other secret information forming information and initial data; and
        a step for replacing the initial data by the calculated latest intermediate data.

11. An apparatus according to claim 10, wherein said storing circuit in use holds said secret information forming information as a plurality of secret information partial information.

12. An apparatus according to claim 11, wherein said processing means operates to output a same processing result of said processing result.

13. An apparatus according to claim 10, wherein said processing means operates to output same processing result of said processing result.

14. An apparatus according to claim 10, wherein said secret information is a private key for decrypting or forming a digital signature in a public key encryption technique.

15. An apparatus according to claim 10, wherein said arithmetic operation processing circuit executes said converting means at a predetermined timing.

* * * * *